United States Patent [19]

Arredondo, Jr.

[11] Patent Number: 5,246,275

[45] Date of Patent: Sep. 21, 1993

[54] WHEEL FOR BICYCLES AND METHOD OF PRODUCING

[76] Inventor: Rene N. Arredondo, Jr., 20162 E. Santiago Canyon Rd., Organe, Calif. 92669

[21] Appl. No.: 477,195

[22] Filed: Feb. 6, 1990

Related U.S. Application Data

[63] Continuation of Ser. No. 88,618, Aug. 21, 1987, abandoned.

[51] Int. Cl.$^5$ .............................. B60B 5/02; B60B 1/00
[52] U.S. Cl. ...................................... 301/64.7; 301/95; 301/104
[58] Field of Search ................ 301/54, 58, 59, 67, 301/74, 95–98, 104, 64.7, 110.5, 64.1

[56] References Cited

U.S. PATENT DOCUMENTS

| | | | |
|---|---|---|---|
| 1,064,066 | 6/1913 | Funk | 301/96 |
| 1,306,952 | 6/1919 | Dickson | 244/130 |
| 1,560,565 | 11/1925 | Graham | 301/104 |
| 1,693,360 | 11/1928 | Baker | 301/64 R |
| 1,753,307 | 4/1930 | Arnold | 301/104 |
| 1,829,500 | 10/1931 | Brown | 244/103 S |
| 2,017,207 | 10/1935 | Hathorn | 244/130 |
| 2,104,112 | 1/1938 | Barratt | 301/64 R |
| 2,363,126 | 11/1944 | Gibson | 244/103 S |
| 3,656,531 | 4/1972 | Ross et al. | 301/64.7 |
| 3,862,779 | 1/1975 | Jayne | 301/64 SH X |
| 4,153,267 | 5/1979 | Hilber | 301/104 |
| 4,314,964 | 2/1982 | Ferrary | 301/93 PN X |
| 4,527,839 | 7/1985 | Fujitaka et al. | 3091/63 PW X |
| 4,639,046 | 1/1987 | Oleff et al. | 301/93 PW |
| 4,741,578 | 5/1988 | Viellard | 301/58 X |

FOREIGN PATENT DOCUMENTS

| | | | |
|---|---|---|---|
| 0073408 | 3/1982 | European Pat. Off. | 301/63 PW |
| 0051996 | 5/1982 | European Pat. Off. | 301/63 PW |
| 2703573 | 11/1977 | Fed. Rep. of Germany | 301/104 |
| 3536308 | 4/1987 | Fed. Rep. of Germany | 301/63 PW |
| 371124 | 1/1907 | France | 301/64 R |
| 678786 | 4/1930 | France | 244/103 S |
| 0067104 | 4/1984 | Japan | 301/63 PW |
| 0074701 | 4/1987 | Japan | 301/104 |
| 0128803 | 6/1987 | Japan | 301/63 PW |
| 4388 | of 1897 | United Kingdom | 301/104 |

OTHER PUBLICATIONS

Bicycles & Tricycles, The MIT Press, London, England, Archibald Sharp, p. 352.
Bicycling, Cover Story: Aerodynamic Overhaul, Jun. 1987, Chester R. Kyle, Ph.D., pp. 72 to 79.
BDS, Bicycle Dealer Showcase, vol. 15, No. 10,. Oct. 1986, pp. 10, 12, 14 & 15.
Theory of Wing Sections, Including a Summary of Airfoil Data, Dover Publications, Inc., 1959, by Abbott and von Doenhoff, pp. 111 to 115.
Publication AMS 3902.
Stiffness Characteristics of Bicycle Wheels, Bike Tech, vol. 4, No. 3, Jun. 1985, pp. 1 to 7.
Ferropreg ® CE-9010A/120 Style Epoxy/Kevlar, 1 page.
Ferropreg ® CE-9000/181 Style Epoxy/Kevlar, 1 page.
Ferropreg ® CE-9011/T-300 3K Unidirectional Tape, 1 page.
Ferropreg ® CE-9000-2/120 Epoxy/Glass, 2 pages.
Ferropreg ® CE-9000/6581/S2 Glass, 1 page.

(List continued on next page.)

*Primary Examiner*—Russell D. Stormer
*Attorney, Agent, or Firm*—F. Eugene Logan

[57] ABSTRACT

A lightweight, high strength wheel having good aerodynamics both head-on and laterally is provided by this invention. The head-on aerodynamics of the wheel is as good or better than disk wheels of same size and weight while having adequate lateral, radial and torsional stiffness. There is also provided by this invention a method of producing a lightweight, high strength composite wheel. In one embodiment of this invention the composite structure comprises high strength fibers such as aromatic polyamide or carbon fibers or the like. In another embodiment the composite structure is hollow to reduce the weight of the wheel.

38 Claims, 7 Drawing Sheets

OTHER PUBLICATIONS

S2 Glass ® Fiber High Performance/Low Cost Reinforcements, 8 pages.
Ferropreg ® CE 321R/S-20, 20 end, 2 pages.
Fiberglass ® Comparative Data E, S and S2 Glass, 1 page.
Unidirectional "Thornel" 300/Kevlar° 49/Epoxy Hybrids, 4 pages.
Ferropreg ® CE-9000-2/285 Style Epoxy/Kevlar ® 1 page.
Ferropreg ® CE-343/4560. Epoxy/Kevlar Unidirectional, 1 page.
Ferropreg ® CE-324/T300, 3K, 23×24 Epoxy/Graphite, 1 page.
Controlled Flow CE-9011/T-300, 3K, 12.5×12.5 Fabric brand by Ferro Corporation, 2 pages.
CE-3201/112 Volan A Epoxy/Glass brand by Ferro Corporation, 1 page.
Ferropreg ® CE-324/7781 Epoxy/Glass, 1 page.
Dupont's Fiber FP/Epoxy Composites with alumina fibers, 2 pages.
Silicon Carbide Composite Materials of Avco Specialty Materials, 1 page.
Boron Composite Material of Avco Specialty Materials, 1 page.
Celion ® G30-600 Carbon Fibers, 1 page.
Fortafil ® 3(C) Continuous & Chopped Fiber and Technical Data Sheet 872A, 2 pages.
Fortafil ® 3(C) Prepregs and Technical Data Sheet 872D, 1 page.
Araldite ® MY 720 epoxy resin, 6 pages.
Araldite ® 508 flexible liquid epoxy resin, 3 pages.
Epon ® Resin 828 epoxy resin, 3 pages.
Tactix (TM) Performance Polymers For Filament Winding, Braiding and Transfer Molding, 7 pages.
Fiberite ® Composite Material Selection Handbook, 18 pages.
Cyanmid TM BR 92 adhesive paste, 3 pages.
Cyanamid TM BR 90 liquid adhesive, 6 pages.
Cyanamid TM BR 89 structural adhesive, 4 pages.
Cyanamid TM F×M 250 adhesive film, 2 pages.
3M Company Scotch-Weld brand adhesive, 2 pages.
Rigid Epon ® Resin Systems, 4 pages.
Ten Standards Hysol Epoxi-Patch ® Kit Formulations, 1 page.
Dexter Hysol Aerospace Products, pastes & liquids, syntactic foams & core splices, film adhesives and primers, 6 pages.
Aradite ®, Arathane TM, Aravite TM structural adhesives, 4 pages.
Syncore ® HG 9822-1 composite, 2 pages.
Dupont unidirectional Kevlar ® with J-2 thermoplastic polyamide resin, 1 page.
Dupont J-2 Polymer Thermoplastic Resin Impregnated Tapes and Fabrics, 2 pages.
Spectra ® High Performance Hybrid Reinforced Fiber Composites, Optimizing Properties with Polyethylene Fibers, 12 pages.
Xydar ® FC-110 High Performance Engineering Resins, and Vectra TM resins, 3 pages.
Fiberite ® Molding Compounds comprising phenolic, epoxy, silicone, polyamide and melamine molding compounds, 12 pages.
Silastic ® X3-9595 Liquid Silicone Rubber, 3 pages.
Silastic ® Q3-9590 A/B and Q3-9591 A/B liquid Silicone Rubber, 4 pages.
Rhodorsil ® RTV 581 vulcanizing silicone elastomer, 3 pages.
Dapcocast #51 (TM) High Temp Casting Compound pourable tooling rubber, 1 page.
Rhodorsil ® RTV 5896 Silicone Elastomer for Mold Making, 4 pages.

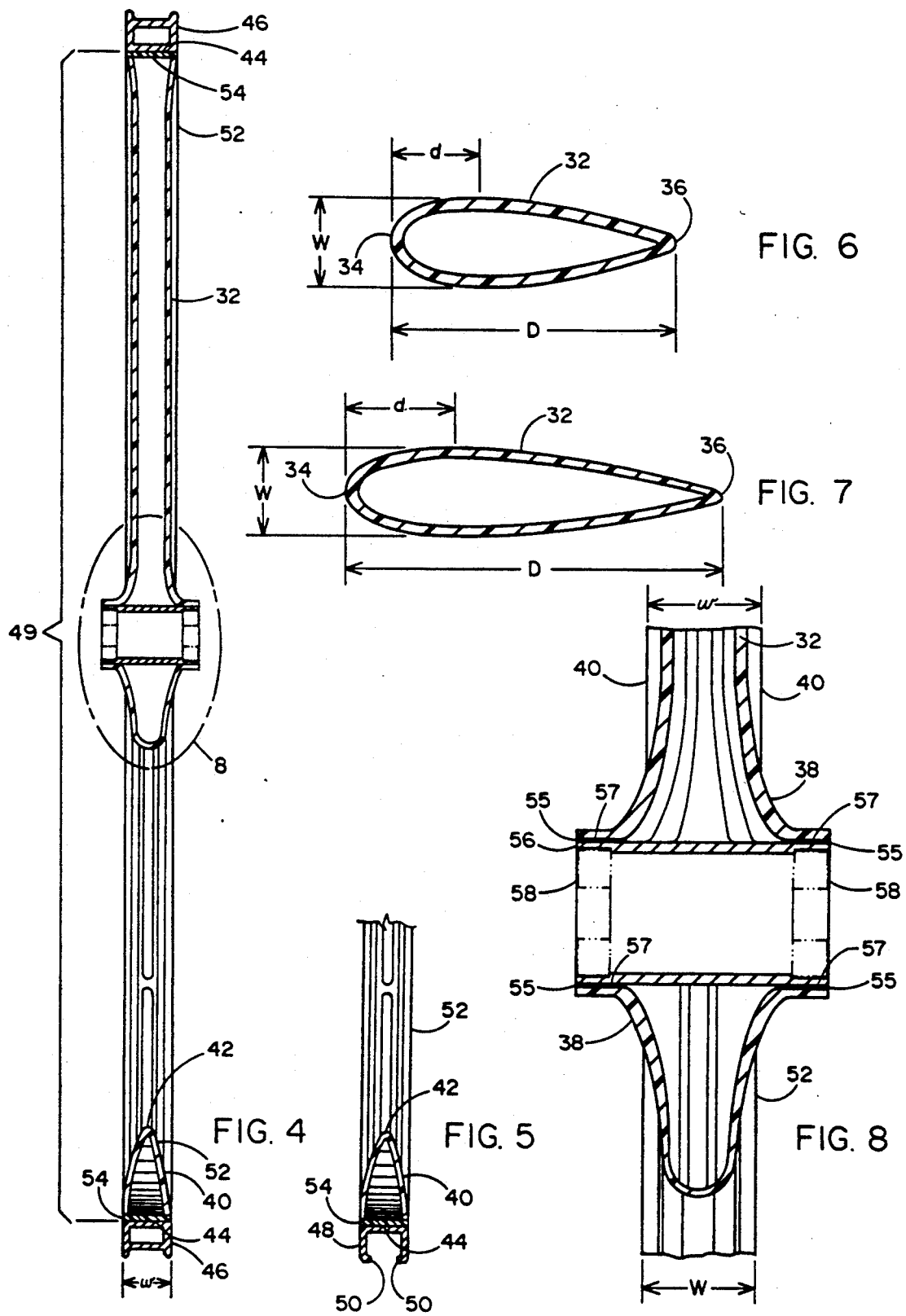

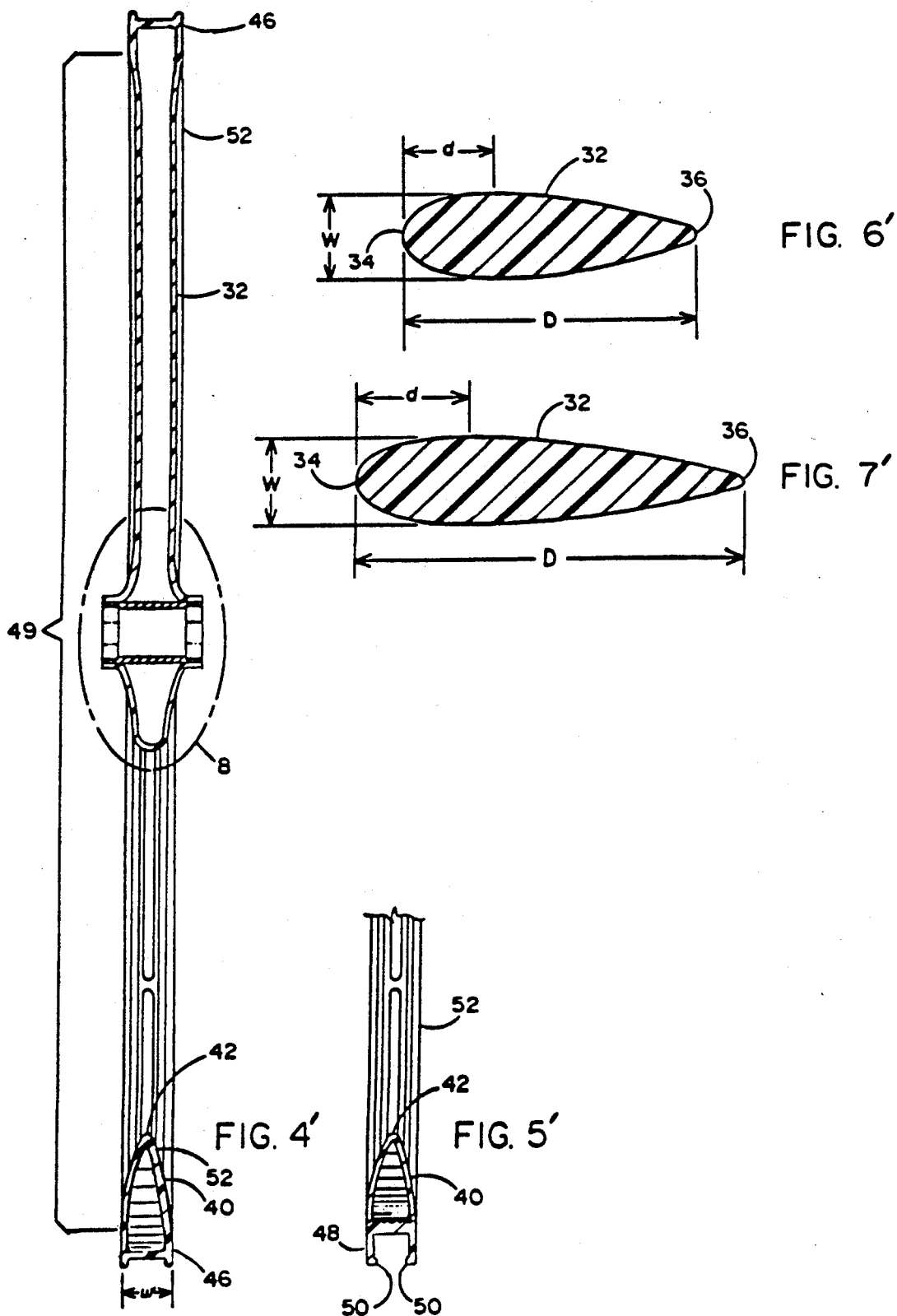

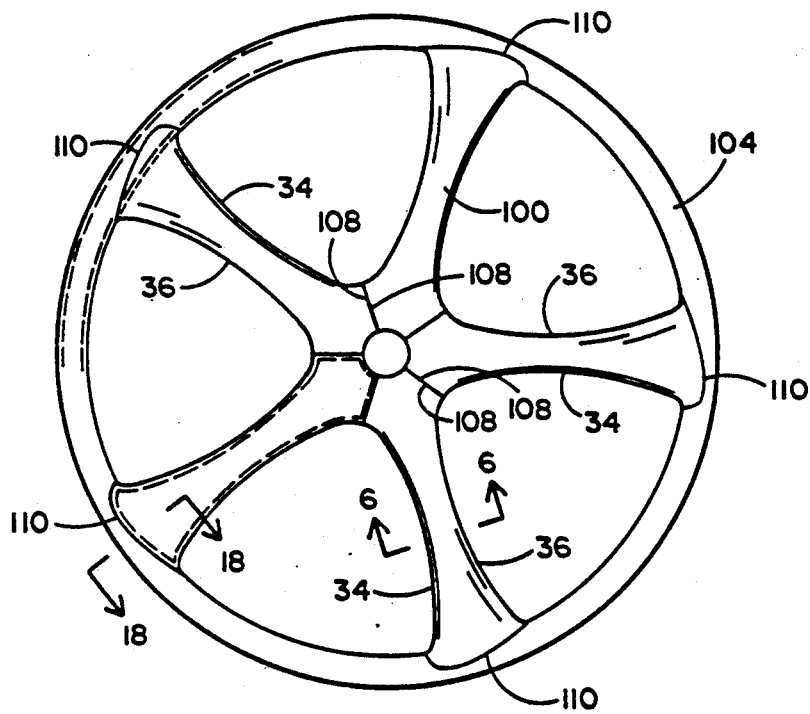
FIG. 16
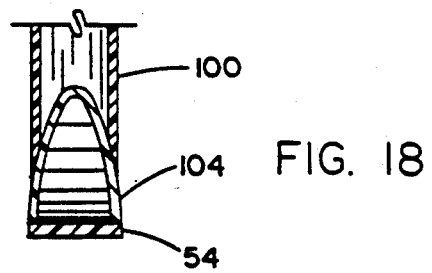
FIG. 18
FIG. 17
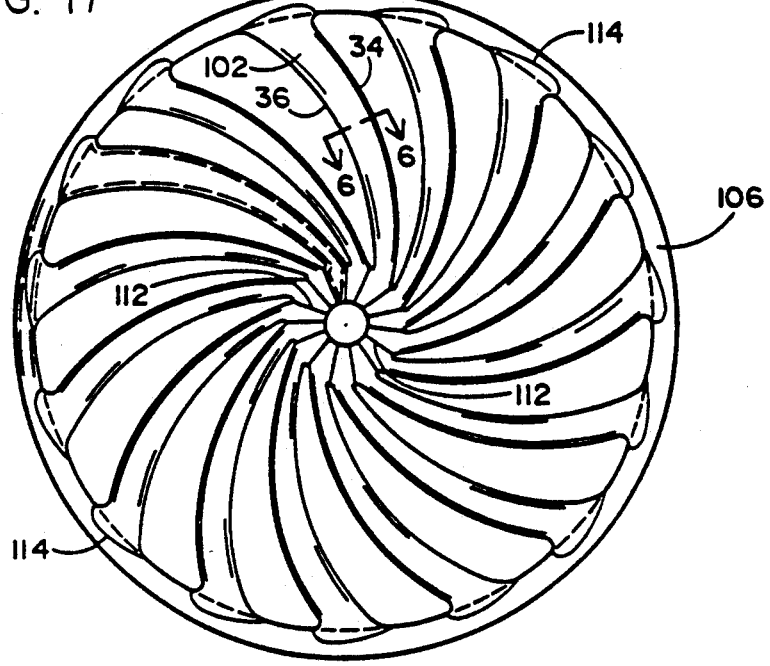

5,246,275

WHEEL FOR BICYCLES AND METHOD OF PRODUCING

This application is a continuation of application Ser. No. 088,618, filed Aug. 21, 1987 now abandoned.

BACKGROUND OF THE INVENTION

Bicycling is becoming more popular in as both an amateur and professional sport for some and as a form of recreation and exercise for others. As the interest in biking increases so has the demand for lighter bikes. Aluminum and graphite fiber materials are of interest to the bicycle industry because they offer lightweight and high strength as is discussed in an article entitled "Aluminum and Carbon Fiber, Aerospace Materials Propel Cycling into the '90's," BDS, Bicycle Dealers Showcase, October 1986, pages 10 to 15 wherein the concerns with present composite frame sets for bicycles is discussed. The effect of drag on various components of a bicycle is discussed in an article entitled "Aerodynamic Overhaul," June 87, pages 72 to 79 of BICYCLING magazine which also discloses the very keen interest in improving performance of bicycling from bicycle construction to bicycle clothing and protective gear to rider position or posture during bicycling.

SUMMARY OF THE INVENTION

Although there are several bicycle frame producers who have developed lightweight frames with good strength, the same degree of improvement has not occurred with regard to bicycle wheels except for the disk wheels. Although disk wheels have been shown to have substantially better head-on aerodynamics, disk wheels usually weigh too much and/or have a low level of stiffness, especially lateral stiffness. Low lateral stiffness can cause a wheel to flex and in a worse case fail. Wheel flexing can cause added rider fatigue which, of course, is not desirable particularly in racing events. Apart from either weighing too much or being too weak structurally, disk wheels because they are solid are influenced by cross winds to such an extent that in sever cross winds the controllability of a bicycle with disk wheels is poor especially at high speeds under fatiguing racing conditions. In sever cross winds the poor controllability can lead to accidents with others especially under racing conditions.

Thus, there is a need for a lightweight bicycle wheel with good strength having not only improved head-on aerodynamics but also good cross wind aerodynamics. Therefore what is needed is a wheel having the strength and cross wind aerodynamic characteristics of a conventional steel spoke wheel and the improved head-on aerodynamics characteristics of disk wheel while also being lightweight.

Accordingly, one objective of this invention is to produce a lightweight, high strength wheel.

Another objective of this invention is to produce a wheel which will not be severly influenced by cross winds.

Still another objective of this invention is to produce a wheel having substantially better stiffness, especially lateral stiffness over that of disk wheels of the same size and weight.

Accordingly, there is provided by this invention a wheel comprising a hub having an axial bore, an inner rim connected to the hub by spokes and adaptable for being fastened to an outer rim which is adaptable for receiving a tire, and a bearing block fastened to the axial bore of the hub and adaptable for receiving a bearing subassembly with an axle. The wheel has at least three spokes each of which has an aerodynamic shape.

By "aerodynamic shape" as used herein is meant that the cross section of the spoke in the axial direction has a length to thickness ratio of at least about two. In one embodiment such ratio is at least about three and in an especially preferred embodiment such ratio is at least about four. To improve upon the head-on aerodynamics of the wheel, in one embodiment the spokes have a leading edge and a trailing edge. In a further embodiment of this invention the radius of curvature of the leading edge is at least as large as the radius of curvature of the trailing edge. In another embodiment of this invention the spokes are elliptical shaped in cross section. In yet another embodiment the radius of curvature of the leading edge is at least about two times as large as the radius of curvature of the trailing edge. In a still further embodiment the radius of curvature of the leading edge is at least about three times larger than the radius of curvature of the trailing edge. In a preferred embodiment the radius of curvature of the leading edge is at least about four times larger than the trailing edge. In one embodiment the spokes are symmetrical about a plane perpendicular to the axis of the wheel and through the leading and trailing edges of the spokes.

In one embodiment of this invention the number of spokes is from 3 to 15. In a preferred embodiment the number of spokes is from 3 to 5, and in an especially preferred embodiment the number of spokes is 3.

In another embodiment of this invention the inner rim has a maximum axial thickness and the spokes have a maximum axial thickness which is no greater than the maximum axial thickness of the inner rim.

The hub, spokes and inner rim of the wheel of this invention are a lightweight, high strength material selected from the group consisting of plastic-containing substances and mixtures thereof such that the wheel has a lateral stiffness of at least about 200 lbs per inch, and a radial stiffness midway between spokes of at least about 8000 lbs per inch. The stiffnesses referred to are determined with the wheel having an outer rim fastened to the inner rim and the bearing block fastened to the hub but without a tire and a bearing subassembly with an axle.

In yet another embodiment of this invention the wheel has a trailing edge facing the hub.

In one embodiment of this invention the material is a temperature curable plastic-containing substance. By "temperature curable" as used herein is meant that the material when heated to a predetermined elevated temperature for a predetermined period of time, will be transformed into a unitary solid mass having a defined shape which can be determined in part by the constraints placed upon the material during curing or setting or hardening. In one embodiment, the temperature curable plastic-containing substance also comprises fibers. In one embodiment the fibers are selected from the group consisting of aromatic polyamide fibers, carbon fibers, alumina fibers, silicone carbide fibers, boron fibers, glass fibers and mixtures thereof.

In another embodiment of the wheel of this invention the inner rim comprises a composite closeout rim and a rim part of a spoke-containing member. The composite closeout rim is cylindrical and has an inside diameter and is an unitary composite structure having no bonded joints. The spoke-containing member is an unitary composite structure having no bonded joints and comprises the rim part, spokes and hub. The inside diameter of the composite closeout rim is adaptable for being bonded, and is bonded, to the outside diameter of the spoke-containing member thereby forming a bonded composite structure comprising the unitary composite closeout rim and the unitary spoke-containing member.

By the term "unitary structure" as used herein is meant that the particular part, piece or member referred to is a single piece having no separate-in-time bonded or otherwise fastened joints. Therefore as the term "unitary composite structure" is meant to include a structure formed from layers of plies of composite materials, including composite materials with various fibers since during the curing or setting of these materials a simultaneous transformation occurs which produces a single piece in which the original plies are no longer present in their original form and cannot be separated by any means into their original form at least without destruction of the material. Therefore two separate unitary composite members which are subsequently bonded together even with an epoxy-based adhesive do not form a new unitary structure under the above definition because there is no simultaneous curing or setting of the original two pieces and the epoxy-based joint and as a consequence the bonded joint is distinct.

In a further embodiment of this invention the bonded composite structure is hollow. In yet another embodiment the inner rim is hollow, the spokes are hollow and the hub is hollow.

In still another embodiment of this invention wherein the inner rim, the spokes and the hub are hollow, the spokes have a leading edge and a trailing edge, and the inner rim has a trailing edge facing the hub, the lightweight, high strength material of the inner rim, spokes and hub comprises a first layer of woven aromatic polyamide fibers, followed by a first layer of unidirectional carbon fibers, followed by a second layer of unidirectional carbon fibers, followed by a second layer of woven aromatic polyamide fibers, followed by a third layer of woven aromatic polyamide fibers, followed by a layer of glass fibers. In a further embodiment the fibers of said woven layers of aromatic polyamide fibers and the woven layer of glass fibers, which form the leading and trailing edge of the spoke and the trailing edge of the inner rim, lay at an oblique angle to said edges, and the unidirectional carbon fibers lay in about a radial direction in the spokes and in about a parallel direction to the trailing edge in the inner rim. In yet a still further embodiment the lightweight, high strength material of the inner rim, spokes and hub further comprise several additional layers of unidirectional carbon fibers spaced between the second and third layer of woven aromatic polyamide fibers. The fibers of the several additional layers of unidirectional carbon fibers in the spokes are oblique to the radius of the wheel, and the fibers of the several additional layers of unidirectional carbon fibers in the inner rim are parallel to the trailing edge of the inner rim.

The above described composite structure which comprises both aromatic polyamide fibers and carbon fibers is not subject to catastrophic failure as are composite disk wheels produced with just plies of carbon fibers. Such disk wheels, made with only carbon fiber plies, while being very stiff, when they do fail, fail catastrophically and as a consequence sever injury to the bicyclist can occur.

In another embodiment of the wheel of this invention the inner rim comprises a composite closeout rim and a rim part of a spoke-containing member. The composite closeout rim is cylindrical and has an outside and inside diameter and is a unitary composite structure having no bonded joints. The rim part of the spoke-containing member has an outside diameter; and the inside diameter of the composite closeout rim is adaptable for being bonded, and is bonded, to the outside diameter of the rim part of the spoke-containing member. The lightweight, high strength material of the composite closeout rim comprises a first layer of woven glass fibers which form said inside diameter of the composite closeout rim, followed by several layers of unidirection carbon fibers, followed by a second layer of woven glass fibers which forms the outside diameter of the composite structure. One set of fibers in the layers of woven glass fibers and the fibers of the several layers of unidirectional carbon fibers lay in a circumferential direction in and around the composite closeout rim.

In yet another embodiment the lightweight, high strength material is a plastic-containing substance selected from the group consisting of phenolics, epoxies, silicones, polyimides, melamines, polyethylenes, polypropylenes, polystyrenes, acrylonitrile/butadiene/styrene systems (i.e. ABS's), polycarbonates, polyvinylchlorides, polyphenylenes, polyesters, vinylesters, acetals, polyurethanes, polyamides, polyphenylene sulfides, polysulfones, polyether sulfones, polyetheretherketones, polyetherimide, copolymers of any of the aforementioned, and mixtures thereof. Such materials can also, if desired, contain fibers. The structures from such materials can be solid or hollow, unitary or made from bonded unitary members.

In another embodiment the wheel of this invention further comprises an outer rim connected to the inner rim. The outer rim is adaptable for receiving a tire. The weight of the wheel is no greater than about 0.12 lbs per inch of diameter of the outer rim. The weight and stiffness being determined with the wheel having the outer rim fastened to the inner rim and the bearing block fastened to the hub but without a tire and a bearing subassembly with an axle. The weight per unit length is calculated using the actual outside diameter of the outer rim. In another embodiment the weight of the wheel is no greater than about 0.10 lbs per inch of diameter of the outer rim, and in a preferred embodiment the weight of the wheel is no greater than about 0.08 lbs per inch of diameter of the outer rim.

In one embodiment of this invention the lateral stiffness of the wheel is at least about 300 lbs per inch, and preferably at least about 400 lbs per inch. In one embodiment of this invention the radial stiffness of the wheel is at least about 9,000 lbs per inch, and preferably at least about 10,000 lbs per inch.

With regard to the influence of cross winds on the wheel the open area between the spokes becomes important. To be more precise the spokes, inner rim and hub define an open area. In one embodiment of the wheel of this invention the open area when projected on a plane perpendicular to the axis of the wheel is at least about 30% of the area of a circle of a diameter equal to diameter of the outer rim. In a preferred embodiment the open area is at least about 40% of the area of a circle of a diameter equal to the diameter of the outer rim, and in an especially preferred embodiment the open area is at least about 50% of the area of a circle of a diameter equal to the diameter of the outer rim.

This invention also provides for a method of producing the wheel of this invention. In one embodiment the method produces a wheel having a hollow composite structure. Accordingly, there is provided by this invention a method of producing a hollow composite structure of lightweight, high strength material useful for forming a wheel having an inner rim, a hub and spokes connecting the inner rim to the hub, wherein the number of spokes is at least three. The method comprises covering an inflatable mandrel having an inflatable rim portion, inflatable spoke portions and inflatable hub portions with a predetermined number of layers of lightweight, plastic-containing substances and a temperature curable adhesive which when cured, will form a high strength composite structure. The method further comprises placing the inflatable mandrel containing the predetermined number of layers of substances in a mold having a finished interior surface corresponding to a predetermined wheel contour; inflating the rim, spoke and hub portions of the mandrel containing the layers of substances to an elevated pressure operable for compressing the layers of substances against the interior surface of the mold; and curing the layers of substances, while compressed against the interior surface of the mold, at an elevated temperature and for a period of time operable for transforming the layers of substance and the adhesive into a composite structure. After curing, the thusly formed composite structure is separated from the mold and the mandrel thereby producing a hollow composite structure having lightweight and high strength. In one embodiment the method further comprises forming an axial bore in the hollow composite structure; and bonding a cylindrical bearing block in the thusly formed axial bore. In a still further embodiment the method further comprises covering a cylindrically-shaped mandrel with a predetermined number of cylindrically-shaped layers of lightweight plastic-containing substances and a second temperature curable adhesive which when cured will form a cylindrically-shaped high strength unitary composite structure; curing said cylindrically-shaped layers of substances and the second temperature curable adhesive on the cylindrically-shaped mandrel at an elevated temperature and for a period of time operable for transforming the cylindrically-shaped layers of substances and the second temperature curable adhesive into a unitary cylindrically-shaped composite closeout rim. The thusly formed composite closeout rim is then separated from the cylindrically-shaped mandrel. The diameter of the cylindrically-shaped mandrel is such that the inside diameter of the thusly produced composite closeout rim is adaptable for bonding to the outside diameter of the hollow composite structure. The inside diameter of the composite closeout rim is then bonded to the outside diameter of the hollow composite structure thereby forming a composite wheel subassembly. In a further embodiment the method also comprises bonding a metal outer rim having an inside diameter to the composite wheel subassembly by bonding the inside diameter of the metal outer rim to the outside diameter of the composite wheel subassembly.

In an alternative embodiment of this invention there is provided a method of producing a hollow unitary composite structure of lightweight, high strength material useful for forming a wheel, the material being selected from the group consisting of plastic-containing substances and mixtures thereof, the unitary composite structure having an inner rim part, a hub and spokes connecting the hub to the inner rim part, wherein the number of spokes is at least three and the spokes are aerodynamically shaped, each of the spokes having a leading edge and a trailing edge, wherein the inner rim part has a trailing edge facing the hub. The method comprising:

(a) providing an inflatable mandrel having a rim portion and spoke/hub portions, each of the spoke/hub portions being connected to the rim portion, and each of the spoke/hub portions having a hub portion, the mandrel being operable, when inflated, to cause the hub portions to abut adjacent hub portions, each of the spoke/hub portions having a leading and trailing edge portion, and the inner rim portion having a trailing edge portion facing the hub portions;

(b) covering the inflatable mandrel with a predetermined number of layers of plastic-containing substances and a temperature curable epoxy-based adhesive, wherein the predetermined number of layers is at least four, wherein at least four of the predetermined number of layers also comprise fibers, and wherein at least two of the predetermined number of layers which comprise fibers have a woven fiber format which cover the leading and trailing edge portion of the spoke/hub portion and the trailing edge portion of the rim portion at an oblique angle to the edge portions, wherein the predetermined number of layers of plastic-containing substances is effective, when cured, for forming a hollow unitary composite structure of lightweight and high strength;

(c) placing the inflatable mandrel containing the predetermined number of layers of plastic-containing substances in a mold having a finished interior surface corresponding to the wheel contour desired;

(d) inflating the inflatable mandrel to an elevated pressure operable for compressing the predetermined number of layers of plastic-containing substances covering the mandrel against the finished interior surface of the mold thereby forming a mold assembly;

(e) heating the mold assembly to a predetermined elevated temperature and maintaining the mold assembly at the elevated temperature for a predetermined period of time, wherein the combination of the predetermined elevated temperature and the predetermined period of time is operable for transforming the predetermined number of layers of plastic-containing substances and the temperature curable epoxy-based adhesive into an unitary composite structure having no bonded joints;

(f) after the predetermined period of time, cooling the mold assembly down and deflating the mandrel;

(g) removing the mold from the thusly produced unitary composite structure; and (h) removing the deflated mandrel from the unitary composite structure thereby producing a hollow unitary composite structure having no bonded joints.

In a further embodiment of this invention the method further comprises the additional steps of:

(i) forming an axial bore in the hollow unitary composite structure;

(j) bonding a cylindrical bearing block in the thusly formed axial bore;

(k) covering a cylindrically-shaped mandrel with a predetermined number of cylindrically-shaped layers of lightweight, plastic-containing substances and a second temperature curable adhesive which when cured will form a cylindrically-shaped lightweight, high strength unitary composite structure;

(l) curing the cylindrically-shaped layers of substances and the second temperature curable adhesive on the cylindrically-shaped mandrel at an elevated temperature and for a period of time operable for transforming said cylindrically-shaped layers of substances and the second temperature curable adhesive into an unitary cylindrically-shaped composite closeout rim;

(m) separating the thusly formed composite closeout rim from the cylindrically-shaped mandrel, wherein the diameter of the cylindrically-shaped mandrel is such that the inside diameter of the thusly formed composite closeout rim is adaptable for bonding to the outside diameter of the hollow unitary composite structure;

(n) bonding the inside diameter of the composite closeout rim to the outside diameter of the hollow composite structure thereby forming a composite wheel subassembly having an outside diameter; and (o) bonding a metal outer rim having an inside diameter to the composite wheel subassembly by bonding the inside diameter of the metal outer rim to the outside diameter of the composite wheel subassembly.

In one embodiment the wheel consists of several unitary composite pieces which are bonded together. For example in wheels having relatively many spokes, e.g. wheels having 5 or more spokes and where weight is not as important as it is for "racing" wheels, the spokes can be individually produced as unitary pieces and subsequently bonded to an unitary rim member. In such construction the individual spoke piece can also contain a portion of the hub so that only two mandrel designs or molds are required, i.e. one for the rim and one for the spoke/hub part. In such an embodiment the spoke/hub part is bonded to the rim member and to adjacent spoke/hub parts in the hub section of the spoke/hub part. Such individual unitary pieces can be hollow or solid, with fibers or without.

Accordingly there is also provided a method for producing wheels with hollow spokes in which the individual spokes are produced on a mandrel apart from the rim. In one embodiment the mandrel comprises a plurality of spoke/hub portions which are aligned in series. This embodiment is particularly suited for applying fibers thereto by use of a woven sock-like tube of fibers which comprises cowoven layers of several fibers. For example a cowoven layer of aromatic polyamide fibers, carbon or graphite fibers, and glass fibers. Other fibers can, of course, be substituted for any or all of the above if desired. Hense in yet another embodiment of this invention there is provided a method of producing a hollow unitary composite structure of lightweight, high strength material useful for forming a wheel, the material being selected from the group consisting of plastic-containing substances and mixtures thereof, the unitary composite structure having an inner rim part, a hub and spokes connecting the hub to the inner rim part, wherein the number of spokes is at least three and the spokes are aerodynamically shaped, each of the spokes having a leading edge and a trailing edge, and wherein the inner rim part has a trailing edge facing the hub. The method comprising:

providing an inflatable mandrel having one or more spoke/hub portions connected in series, wherein each of the spoke/hub portions has a hub portion and a spoke portion which has a leading edge portion and a trailing edge portion;

covering the inflatable mandrel with a woven sock-like tube of a plastic-containing substance which comprises fibers and a temperature curable adhesive, wherein the fibers have a woven fiber format which cover the leading and trailing edge portions of the spoke portion at an oblique angle thereto, and wherein the plastic-containing substances is effective, when cured, for forming a hollow unitary composite structure;

placing the inflatable mandrel containing the plastic-containing substances in a mold having a finished interior surface corresponding to the spoke/hub contour desired;

inflating the inflatable mandrel to an elevated pressure operable for compressing the predetermined number of layers of plastic-containing substances covering the mandrel against the finished interior surface of the mold thereby forming a mold assembly;

heating the mold assembly to a predetermined elevated temperature and maintaining the mold assembly at the elevated temperature for a predetermined period of time, wherein the combination of the predetermined elevated temperature and the predetermined period of time is operable for transforming the plastic-containing substance and the temperature curable adhesive into an unitary composite structure having no bonded joints;

after the predetermined period of time, cooling the mold assembly down and deflating the mandrel;

removing the mold from the thusly produced unitary composite structure; and removing the deflated mandrel from the unitary composite structure thereby producing a hollow unitary composite structure having no bonded joints.

If the hollow unitary composite structure is more than one spoke/hub part, then the additional step of separating the spoke/hub parts into individual spoke/hub parts.

Producing the inner rim apart from the spoke/hub parts and bonding the spoke/hub parts to the inner rim and to adjacent spoke/hub parts.

In one embodiment the inner rim is hollow and is produced on an inner rim mandrel. The method further comprises covering the inner rim mandrel with a plastic-containing substance which comprises fibers and a temperature curable adhesive so that the fibers are oblique to the trailing edge of the inner rim. In one embodiment the inner rim mandrel is an inflatable mandrel which after application of the plastic-containing substance and temperature curable adhesive thereto is placed into an inner rim mold having an inner contour of the desired inner rim shape. The mandrel is then inflated thereby compressing the plastic-containing material against the interior surface of the inner rim mold. The material is then cured at an elevated temperature for the required length of time to transform the material into an unitary composite structure having no bonds. The hollow spoke/hub unitary composite structures are then bonded to the hollow inner rim unitary composite structure at the rim and to adjacent hollow spoke/hub unitary composite structures at the hub thereby producing a hollow composite structure having bonded joints.

In yet another embodiment the outer rim which is adaptable for receiving a tire is also produced from a plastic-containing material and a temperature curable adhesive. In one embodiment such composite outer rim is a separate part which is bonded to the inner rim. In an alternate embodiment the outer rim and the inner rim are an unitary composite structure having no bonded joints between the outer rim and the inner rim.

BRIEF DESCRIPTION OF THE DRAWINGS

FIG. 4 is a cross-sectional view of the wheel of FIG. 2 taken through line 4—4 thereof.

FIG. 4' is similar to FIG. 4 except that the outer rim and inner rim is an unitary structure.

FIG. 5 is cross-sectional view of a detail of another embodiment of my wheel which has a rim useful for mounting a clincher-type bicycle wheel.

FIG. 5' is similar to FIG. 5 except that the outer rim and inner rim is an unitary structure.

FIG. 6 is a cross-sectional view of the spoke of FIG. 2 taken through line 6—6 thereof.

FIG. 6' is similar to FIG. 6 except that the spokes are solid.

FIG. 7 is a cross-sectional view of the spoke of FIG. 2 taken through line 7—7 thereof.

FIG. 7' is similar to FIG. 7 except that the spokes are solid.

FIG. 8 is an enlarged cross-sectional detail of the wheel of FIG. 4 showing additional detail of area 8 thereof.

FIG. 16 is an elevational view of another embodiment of my wheel having five aerodynamically-shaped spokes.

FIG. 17 is an elevational view of another embodiment of my wheel having fifteen aerodynamically-shaped spokes.

FIG. 18 is a cross-sectional view of the bonded joint taken through line 18—18 of FIG. 16.

DESCRIPTION OF THE PREFERRED EMBODIMENTS

Figure 1:
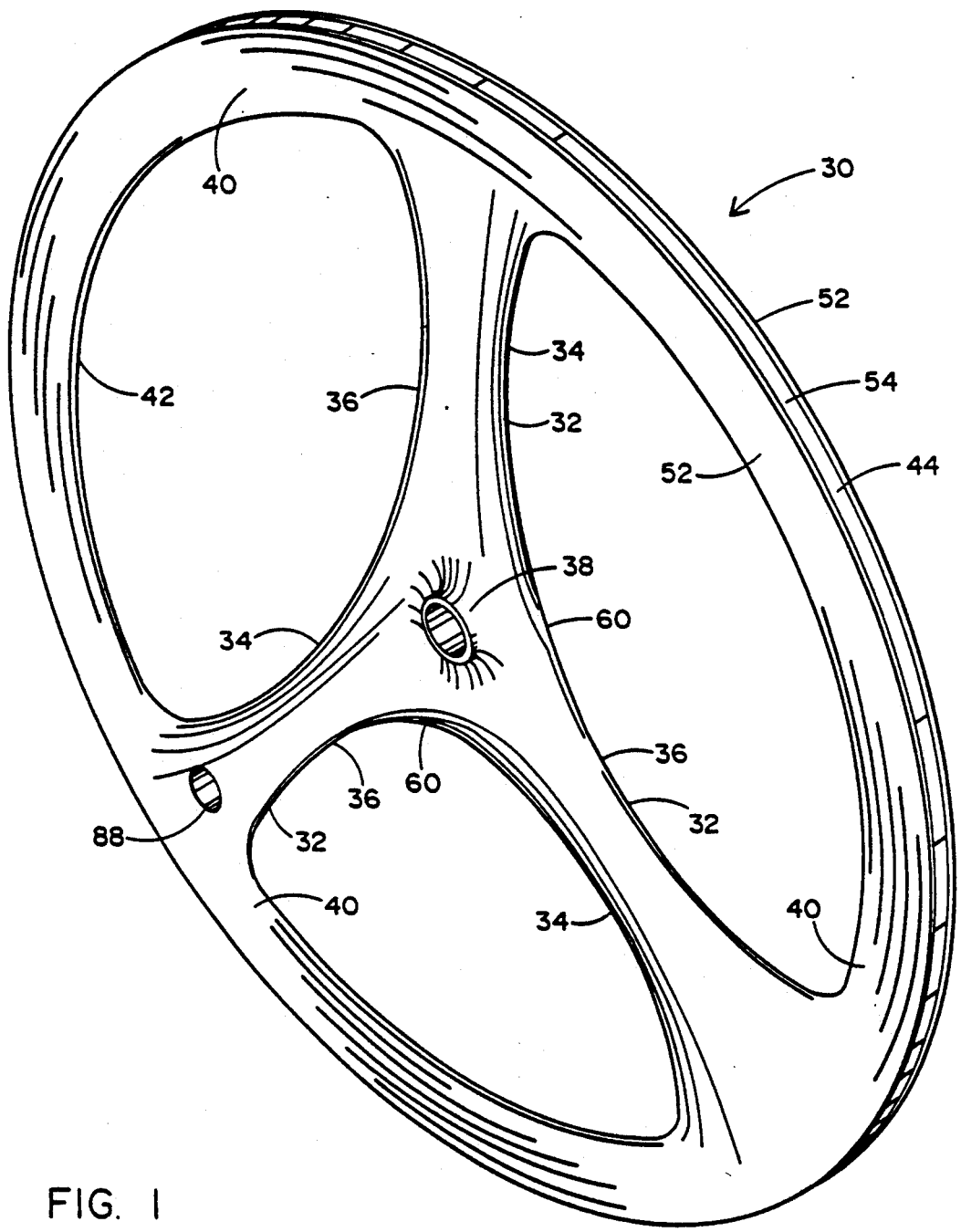
FIG. 1 is a perspective view of a bicycle wheel of my invention with three aerodynamically-shaped spokes, a rim adaptable for receiving a tire and a bearing block adaptable for receiving a bearing subassembly with axle.
Figure 3:
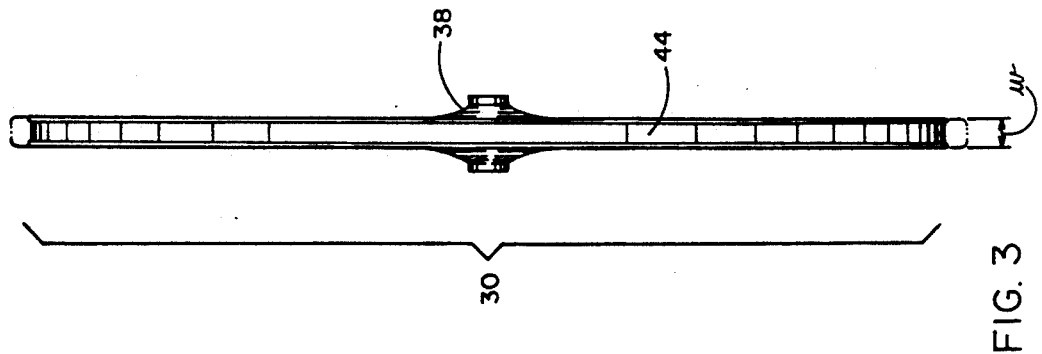
FIG. 3 is a front end view of the wheel of FIG. 1 also showing at the top and bottom a tire in phantom by dashed lines.
Figure 2:
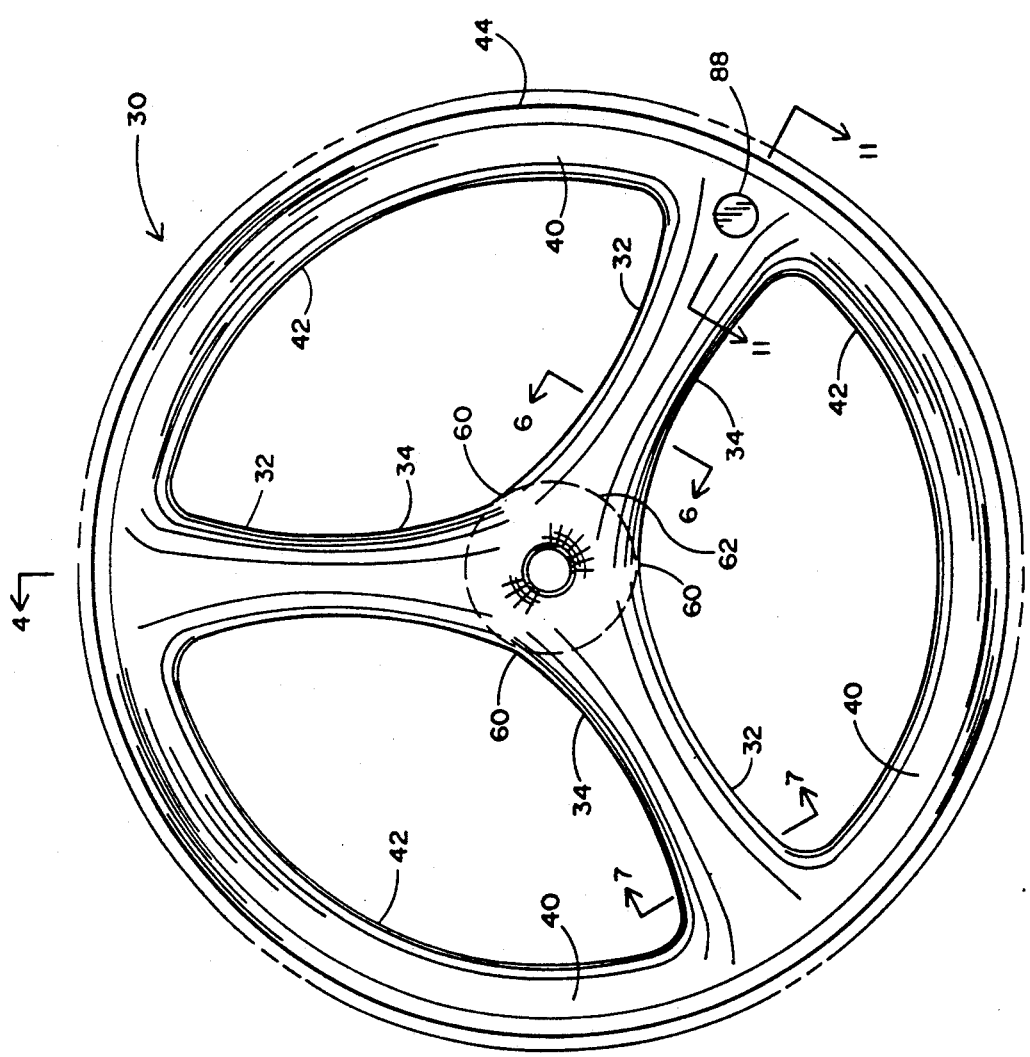
FIG. 2 is the left elevational view of the wheel of FIG. 1 with the large dashed circle representing a tire.

FIG. 1 is a perspective view of one embodiment of the bicycle wheel of this invention without a bearing, axle and tire. FIG. 2 is a left side elevational view and FIG. 3 an end view of the wheel of FIG. 1. The broken lines in FIGS. 2 and 3 represent a tire mounted on the wheel. Wheel 30 has three aerodynamically shaped spokes 32 each having a leading edge 34 and a trailing edge 36, which are uniformly spaced between hub 38 and inner rim 40. Inner rim 40 has an aerodynamically shaped trailing edge 42 facing hub 38 which is best seen in FIGS. 4 and 5.

In one embodiment the wheel is hollow and constructed from a light weight high strength material such as a layered composite of overlaid plies of an aromatic polyamide fiber, graphite fiber and glass fiber bonded together with an epoxy. In one embodiment such fibers are preimpregnated with an epoxy adhesive in mats which are temperature curable, i.e. fusible into an unitary structure when maintained at an elevated temperature for a period of time. The hollow construction of one embodiment of this invention is shown in FIGS. 4 to 8 in which the spokes, hub and inner rim are seen to be hollow.

In one embodiment of this invention there is attached to outer surface 44 of the composite structure of the wheel outer rim 46 or 48. Outer rims are preferably made from aluminum or other light weight metal alloys having good strength. Outer rim 46 is for a sew-up type tire which is glued to the rim. Preferably outer rim 46 is hollow construction to reduce its weight. Outer rim 48 is designed to receive a clincher-type tire and therefore has a small protruding lip or bead 50 extending inwardly from each side of the rim for gripping the bead or ribbed surface of the tire. However, it is to be understood the composite structure, 49, of this invention, can be used with an outer rim of the user's choice and that it is not necessary to use outer rim 46 and 48. An advantage of making the outer rim a separate piece from the inner rim but bonded to the inner rim is that if the outer rim is damaged from road impact, it can be easily removed from the wheel and replaced with a new outer rim. Furthermore by making the outer rim from aluminum or an alloy, the outer rim will absorb most of the shock from pot holes and the like in the road thereby preventing damage to the stiffer composite structure portion of the wheel. Another advantage for having the outer rim made separately and from a metal is that the brake pads work better pressed against a metal surface, especially aluminum, than against a composite surface and furthermore the frictional heat produced by braking is more readily dissipated. In an alternative embodiment of this invention in which the outer rim of the wheel is also a composite material, in order to provide an improved surface for the brake pads to rub or bear against, a thin metal sheet is bonded or plasma sprayed onto first piece 52 to provide a metal bearing surface for the brake pads to rub against.

In one embodiment of this invention the wheel comprises two principal pieces of composite material which are bonded together as best seen in FIGS. 4 and 5. A first piece, 52, consists of the hub, spokes and most of inner rim 40. In one embodiment, which will be more fully described below, first piece 52 is a single unitary constructed piece. In this embodiment neither the spokes nor inner rim 40 are produced by bonding to mirror image pieces together, i.e. two pieces divided by a plane perpendicular to the axis of the wheel and through the leading and trailing edges.

A second piece or composite annular closeout rim 54 is bonded to the outermost portion of piece 52 and when thusly bonded completes inner rim 40. Aluminum or alloy outer rim 46 or 48 is then bonded to outer surface 44 of closedout rim 54. In another embodiment the alloy or aluminum rim is bonded directly to first piece 52 and composite closeout rim 54 is not used.

After outer rim 48 is bonded to the wheel, annular bearing block 56 is then bonded with epoxy 55 to axial cylindrical bore 57 of hub 38. Bearing block 56 is adapted to receive a pair of bearings, 58, which provided support for and receive an axle (not shown).

FIGS. 4' and 5' show alternate embodiments of this invention wherein the outer rim and inner rim are unitary structure.

FIGS. 6' and 7' show another alternative embodiment of this invention wherein the spokes are solid.

As can be seen in FIGS. 1 and 2 the contour of the wheel at points 60 features a blending of leading edge 34 into trailing edge 36 and then a radially inward blending thereof with the external surface of hub 38 so as to form a smooth transition between the surfaces of the leading and trailing edges and the hub. There is also a smooth transition between the surfaces of spokes 32 and inner rim 40. Unless otherwise specified, by the term "hub" as used herein is meant the portion of composite structure 49 which is within dashed circle 62 shown in FIG. 2 which includes the points of merger of leading and trailing edges, i.e. points 60.

In one embodiment, spokes 36 are aerodynamically shaped as shown in FIGS. 6 and 7. In this particular embodiment the point of maximum axial thickness of the spoke, distance "W", is spaced a predetermined distance, "d", from leading edge 34. The maximum circumferential width or chord length of the spoke at any radial distance from the axis of the wheel is designated as distance "D". The actual length of D varies depending on the radial distance from the axis of the wheel. In the embodiment shown in FIGS. 1 to 8 the ratio of "d/D" is about 0.30. In this particular embodiment the axial thickness of the spoke at any point in relation to the circumferential width of the spoke is defined by formulas known as the NACA Four-digit Wing Section, Thickness distribution. In particular, the formula for ½ of the axial thickness of the spoke, or $y_t$, used was $$\pm y_t = (t/0.20)(0.29690\sqrt{x} - 0.1260x - 0.3516x^2 + 0.2843x^3 - 0.1015x^4)$$

where t is the maximum thickness of the spoke expressed as a fraction of the chord. This formula and the use thereof are described is the text entitled "Theory of Wing Sections, Including A Summary of Airfoil Data", Dover Publications, Inc., 1959, by Abbott and von Doenhoff, Library of Congress Catalog Card No. 486-60586-8 pages 111 to 115 which are hereby incorporated herein by reference. In the above formula x is a fraction of chord and the maximum thickness occurs at x=0.30 where $y_t = \pm 0.5t$ meaning that one half of the thickness lies on each side of the cross-sectional centerline of the aerodynamically shaped spoke.

It should be noted that in the embodiment shown in FIGS. 1 through 8, the maximum axial thickness W of the spokes is approximately constant throughout the entire radial length of the spoke; however, the circumferential width, D, of the spokes is smallest at the radius through line 6—6 of FIG. 2 and increases both as the spoke nears the hub and as the spoke nears inner rim 40. With these definitions in mind it is noted that W=2t.

It should also be noted that in this particular embodiment of this invention, the maximum axial thickness "w" of inner rim 40 is approximately equal to the maximum axial thickness "W" of the spokes, and that the axial thickness of outer rims 46 and 48 is about equal to the maximum axial thickness "w" of inner rim 40. Because of this the "head on" profile of this embodiment, as best seen in FIG. 3, is substantially thinner than that of a conventional 36 spoke wheel thereby improving the aerodynamics of the wheels of this invention. However, even if maximum axial thickness W of the spoke is larger than the maximum axial thickness w of inner rim 40, improved aerodynamics relative to a conventional spoke wheel will still be achieved if other principals of this invention are used in the wheel design.

Figure 9:
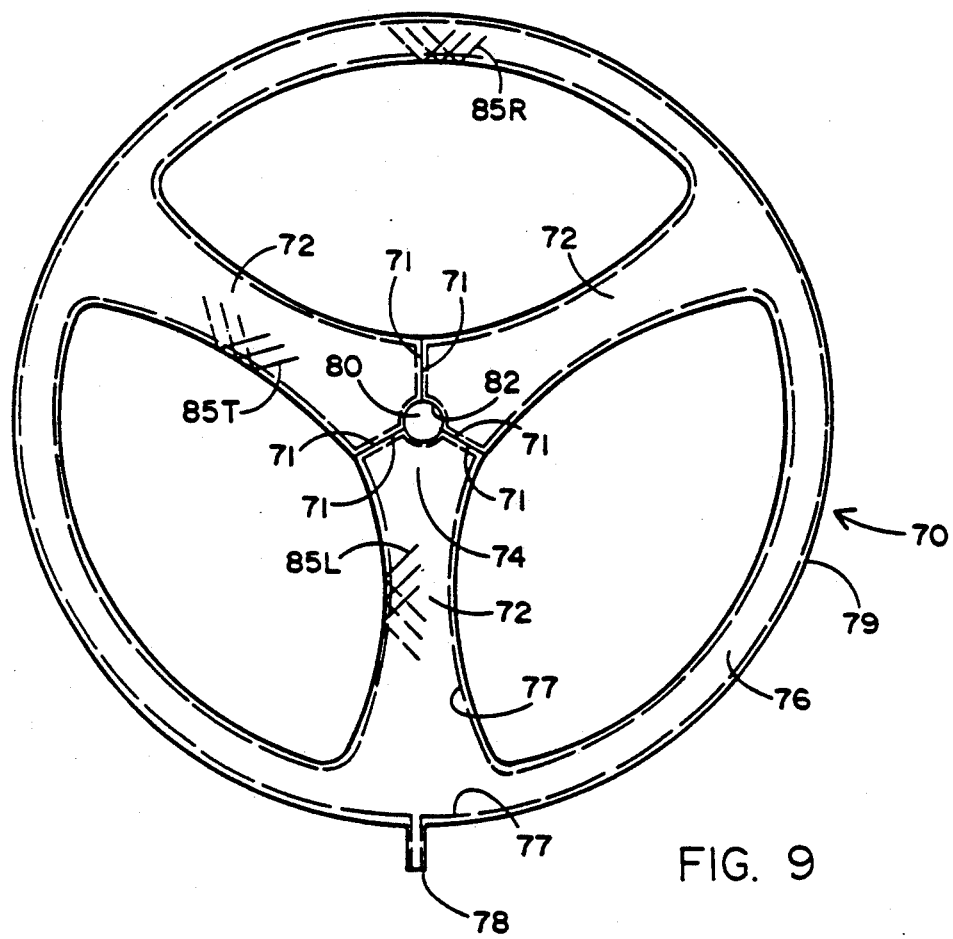
FIG. 9 is a side elevational view of an inflatable mandrel made from a stretchable and flexable substance such as rubber or a silicone elastomer. The mandrel is used for laying up plies of plastic-containing material to produce the hollow composite structures of this invention.

This invention also provides for a method of making the wheel of this invention. In one embodiment of this invention, the wheel is made using an inflatable hollow mandrel 70 shown in FIG. 9 which is used to produce piece 52 of the wheel. Although the mandrel is one piece construction, hub portion 74 thereof is split into three separate parts at abutting surfaces 71 thereby forming three spoke/hub portions 72. Each spoke portion is joined to inner rim portion 76 of the mandrel. The split provided by abutting surfaces 71 in spoke/hub portion 72 of the mandrel is necessary inorder to remove the mandrel from piece 52 after it has been hardened or cured. Dotted lines 77 in FIG. 9 represent the interior surface of the mandrel.

Because the curing of composite structure 52 occurs at high temperature the mandrel is preferably made of a high temperature resistant elastic material. Nonlimiting examples of such elastic material are rubbers or silicone based elastic materials. The mandrel is provided with inner tube like inlet nipple 78 for inflating the mandrel with air.

Figure 10:
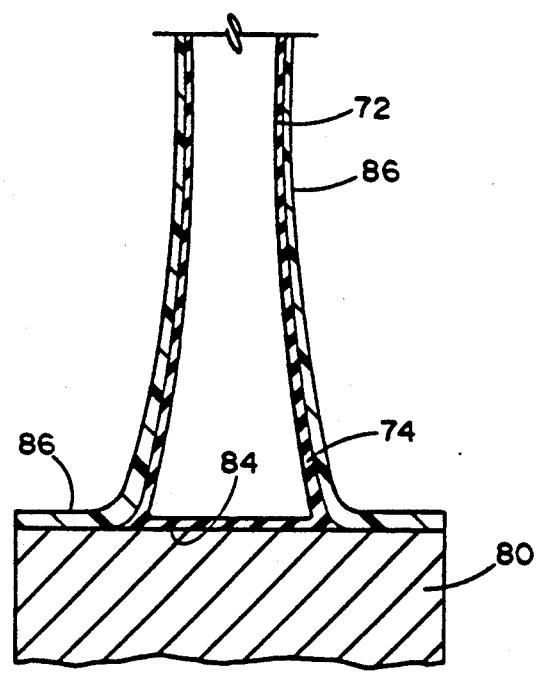
FIG. 10 is a detail of the hub portion of the mandrel of FIG. 9 with plies of plastic-containing material applied thereto.

First composite piece 52 is produced by partially inflating mandrel 70 so that it will keep its shape. Silicone plug 80, FIG. 10, is sprayed with a light coating of rubber cement and inserted into axial hole 82 of mandrel 70. Cylindrical shaped surfaces 84 of mandrel are pressed against the glue containing cylindrical surface of plug 80 until surfaces 84 are firmly held against the mandrel. Various plies of composite material 86 are then applied to the mandrel in a predetermined orientation as will be explained later. After all plies have been added to the mandrel, the mandrel containing the plies is placed in a mold. The mandrel is then inflated to a elevated pressure, e.g. 150 psig (10.5 kg/sq. cm), to compress the plies against the opposing inner surfaces of the mold. The mold, of course, has an internal contoured finished surface which is shaped so that the cured composite material will have the desired shape, e.g. a shape like piece 52, and require little or no additional machining to produce the final composite product. The mold containing the uncured composite is then placed in an oven and the composite is cured at a predetermined elevated temperature for a predetermined length of time. In one embodiment the composite is cured at about 350 degrees F. (177 degrees C.) for about two hours. The curing temperature and time will vary depending on the type and amount of materials used to form the composite.

After curing, the mold and its contents are cooled down to room temperature. The mold is then separated from the cured composite, the mandrel is deflated and plug 80 is then removed from the cured composite form and mandrel. Next the mandrel, is pulled from the inside of the cured composite form by pulling spokes portions 72 from the inside of spokes 32 and pulling rim portion 76 from the inside inner rim 40. The mandrel is then cleaned up and readied for reuse to produce the next wheel, i.e. the next piece 52.

Hub 38 is machined to the desired axial thickness and inner bore. Annular bearing block 56 is then bonded to inner bore 57. Epoxy adhesives have been found to produce strong bonds between pieces 52 and blocks 56. The outer diameter of piece 52 is then machined to the desired diameter.

A second principal composite piece or composite closeout rim 54 is produced by applying plies of composite materials in a predetermined orientation to a metal mandrel (not shown). The closeout piece is cured in the same manner as the first piece. After curing the closeout piece is cooled to room temperature, removed from the metal mandrel and bonded with an adhesive to first piece 52. Epoxy adhesives have been found to produce strong bonds between principal pieces 52 and 54.

An alloy or aluminum rim is then bonded to the outside surface of closeout piece 54. Epoxy adhesives have been found to produce strong bonds between the metal rims and the composite wheels.

Figure 11:
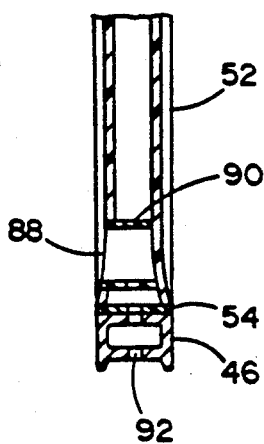
FIG. 11 is a detail of the access for reaching a valve stem (not shown) to a tire as taken through line 11—11 of FIG. 2.

The wheel is now ready for completing of the valve stem access. First an axial access hole, 88, approximately one inch in diameter (2.5 cm) is drilled into one side of inner rim 40 along the center plane of a spoke as shown in FIG. 11. A short length cylinder made of a composite, referred to herein as a valve stem closeout ring 90, is then installed and bonded to the surface of access hole 88 and the inside of the opposing composite wall. Next a valve stem insertion hole, 92, about 0.25 inches in diameter, is drilled through the metal rim, closeout rim 54 and one side of ring 90.

At this point the wheel is complete and ready for installation of bearings, axle and tire of the user's choice.

Figure 12:
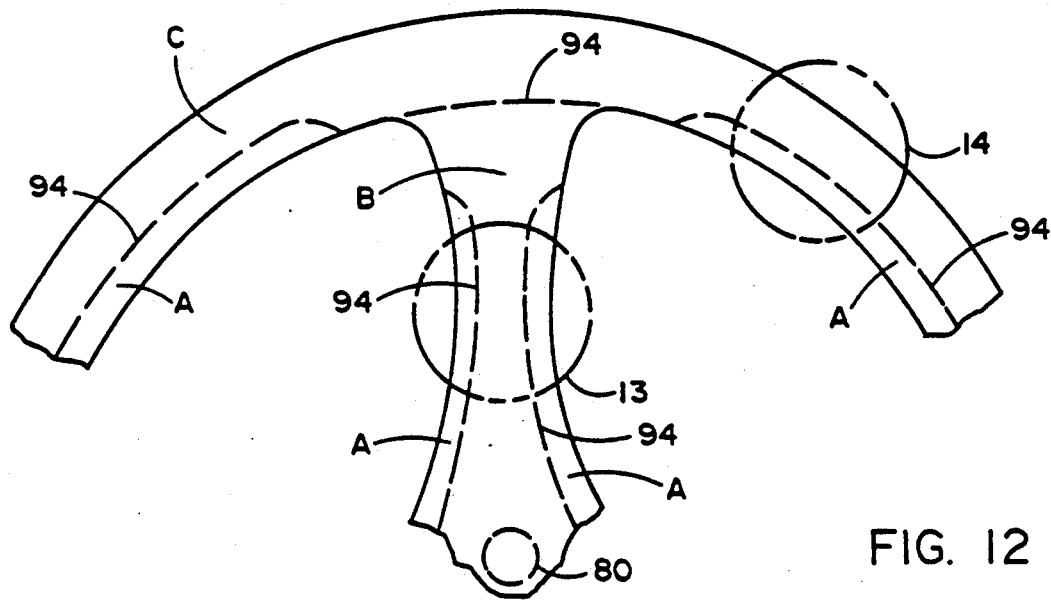
FIG. 12 is a pattern for laying up plies of plastic-containing material on the mandrel of FIG. 9.
Figure 13:
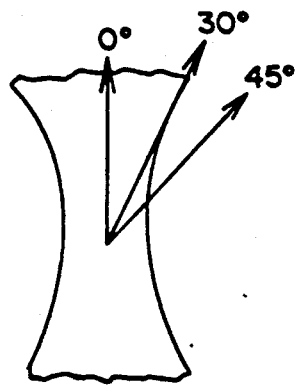
FIG. 13 is detail 13 of the spoke portion of the ply lay up shown in FIG. 12 showing the orientation of plies referred to in Table 1.
Figure 14:
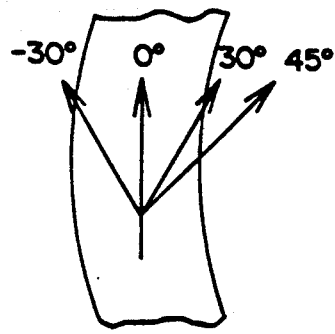
FIG. 14 is detail 14 of the rim portion of the ply lay up shown in FIG. 12 showing the orientation of plies referred to in Table 1.
Figure 15:
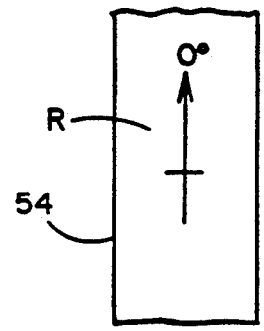
FIG. 15 is a detail of a composite closeout rim showing the orientation of plies referred to in Table 1.

Returning to the point in the process in which the several plies are applied to mandrel 70 and the metal mandrel for producing closeout rim 54, attention is directed to FIGS. 12 to 15 and Table 1. FIG. 12 identifies three regions defined approximately by dotted lines 94, i.e. A, B and C of the composite wheel which in one embodiment have a predetermined order of application and orientation of plies to the mandrel. However, it should be understood that preferably the plies of regions A, B and C do not all end at exactly line 94 but that there is a certain amount of overlap of the plies from one region into the other. The materials of the plies and order of application used in one embodiment of this invention are identified in Table 1 for regions A, B and C. FIGS. 13 to 15 show the fiber orientation of the various plies referred to in Table 1 for the spoke area, rim area and closeout rim, respectively. FIG. 15 and Region R pertain to closeout rim 54, which as mentioned earlier is produced apart from first piece 52. Closeout rim 54 is in one embodiment a single unitary constructed piece, which is bonded to piece 52.

The various fibers mentioned in Table 1 can be obtained in the form of woven or undirectional fiber mats which are preimpregnated with an epoxy. These fiber mats can be cut to any desired shape and applied to the mandrel without the need of additional epoxy. The mats are slightly tacky so that once applied to the mandrel or to a prior layer of fibers, they will stay in place long enough for the piece to be shaped and placed in an oven for curing.

It is to be noted that in the application of the several plies to the mandrel that layer 1 is applied to regions A, B and C first. In this embodiment it is also noted that the first four layers, i.e. 1 through 4A, are the same fiber in regions A, B and C and that the orientation of the fibers in regions A and B are also identical; see Table 1 and FIG. 13.

After layer 4A, region B corresponding to the spoke, and region C corresponding to the outer portion of the inner rim, each receive four plies, i.e. layers 4B through 4E, of undirectional graphite fibers, sometimes referred to as "Uni-Graphite" to increase the strength of the wheel in these regions.

After layer 4E, two final layers of plies, i.e. layers 5 and 6, are applied to the entire wheel, i.e. regions A, B and C. The same material and orientation is used in each region for plies 5 and 6. In the application of plies to region A of mandrel 70, in one embodiment of this invention, the fibers of a given ply are wrapped over spoke/hub portion 72 of mandrel 70 which corresponds to the leading edge of the spoke and the ply is then spread towards the opposite trailing edge portion of the same spoke/hub portion. Similarly the fibers of a given ply are wrapped over spoke/hub portion 72 of mandrel 70 which corresponds to the trailing edge of the spoke and the ply is then spread towards the opposite leading edge portion of the same spoke/hub portion. This method of application of the plies to the spoke portion of mandrel 70 provides for continuous fibers spanding both the leading and trailing edges and thereby strengthens the spokes of composite structure 49. The spanding of the fibers over the leading and trailing edges is shown for a 45 degree orientation (FIG. 13) by lines 85L and 85T, respectively, in FIG. 9.

In a similar manner the fibers of a given ply are wrapped over inner portion 76 of mandrel 70 which corresponds to trailing edge 42 of the inner rim of composite structure 49 and the ply then spread towards both sides of large outside diameter 79 of mandrel 70 as shown for a 45 degree orientation (FIG. 14) by lines 85R in FIG. 9.

As mentioned earlier, in one embodiment of this invention composite closeout rim 54 is formed on a separate metal mandrel sized to produce a single unitary piece adapted for bonding on first piece 52. In one embodiment of this invention five plies all of which have fibers oriented in the same direction are applied to the metal mandrel as indentified in region R of Table 1 and shown in FIG. 15.

All of the materials listed in Table 1 are available as epoxy preimpregnated sheeting. The use of preimpregnated sheeting enables the mandrels to be wrapped easily and without the difficulties and mess associated with painting of liquid epoxies on dry fiber mats. Of course, dry fiber sheeting which has not been preimpregnated can be used with epoxy painted thereon if desired for any reason.

The material identified as Kevlar ® is a brand of aromatic polyamide fiber of extremely high tensile strength and greater resistance to elongation than steel. Its high energy absorption property makes it particularly suitable for use in belting radial tires, for which it was developed. It is used as a reinforcing material for plastic composites, and in cordage products. The 120 Kevlar material is about 0.0035 inches (0.09 mm) thick and is a 120 cloth style. The 181 Kevlar material is about 0.010 inches (0.25 mm) thick and is a 181 cloth style. Since the weave is 90 degrees and the warp and fill are the same, there is no difference between a +45 degree and a −45 degree orientation (referring to FIGS. 13 and 14) in application of the plies of these materials to the mandrel.

The undirectional graphite material is a carbon or graphite fiber which is three times stronger (tensile strength) per unit weight than steel. Besides having high tensile strength, it also has high stiffness.

The E-Glass material is a standard industrial-reinforcement grade glass fiber. S-Glass material is the highest strength reinforcement grade fiber glass and S2-Glass is a high-strength, moderate-cost reinforcement grade fiber glass.

Nonlimiting examples of materials useful for forming the composite structure of this invention are described in the following industrial literature, and the following supplier specifications and technical data therefore (which are also listed in Table 1) are hereby incorporated herein by reference:

1. FERROPREG ® CE-9010A/120 STYLE EPOXY/KEVLAR, 1 page
2. FERROPREG ® CE-9000/181 STYLE EPOXY/KEVLAR, 1 page
3. FERROPREG ® CE-9011/T-300 3K UNIDIRECTIONAL TAPE, 1 page
4. FERROPREG ® CE-9000-2/120 EPOXY/GLASS, 2 pages
5. FERROPREG ® CE-9000/6581/S2 GLASS, 1 page
6. S2 GLASS ® FIBER HIGH PERFORMANCE/LOW COST REINFORCEMENTS, 8 pages
7. FERROPREG ® CE 321R/S-20, 20 end, 2 pages
8. FIBERGLAS ® COMPARATIVE DATA E, S and S2 GLASS, 1 page In addition to these materials, the following supplier specification and technical data for the materials below, which are also useful for forming the composite structure of this invention, are hereby incorporated herein by reference:

9. UNIDIRECTIONAL "THORNEL" 300/KEVLAR ® 49/EPOXY HYBRIDS, 4 pages
10. FERROPREG ® CE-9000-2/285 STYLE EPOXY/KEVLAR 49, 1 page
11. FERROPREG ® CE-343/4560 EPOXY/KEVLAR UNIDIRECTIONAL, 1 page
12. FERROPREG ® CE-324/T300, 3K, 24X24 EPOXY/GRAPHITE, 1 page
13. CONTROLLED FLOW CE-9011/T-300, 3K, 12.5 X 12.5 FABRIC brand by Ferro Corporation, 2 pages
14. CE-3201/112 VOLAN A EPOXY/GLASS brand by Ferro Corporation, 1 page
15. FERROPREG ® CE-324/7781 EPOXY/GLASS, 1 page All of the above composite-forming materials are available in fiber mats preimpregnated with epoxy.

One or more of the plies containing aromatic polyamide fibers or graphite fibers can be replaced with plies containing other fibers such as alumina, silicon carbide, boron fiber or the like. Any of the various fibers mentioned can be either preimpregnated with an adhesive or used without a preimpregnated adhesive. For example commercially available high strength carbon fibers, which are surface treated to promote adhesion to organic matrix polmers, are compatible with a number of fusing agents. Examples of fusing agents are epoxies, unsaturated polyesters and a variety of other resins. Nonlimiting examples of such other useful materials are described in the following supplier specification and technical data, which are hereby incorporated herein by reference:

16. DUPONT'S FIBER FP/Epoxy Composites with alumina fibers, 2 pages
17. SILICON CARBIDE COMPOSITE MATERIALS of Avco Specialty Materials, 1 page
18. BORON COMPOSITE MATERIAL of Avco Specialty Materials, 1 page
19. CELION ® G30-600 Carbon Fibers, 1 page
20. FORTAFIL ® 3(C) CONTINUOUS & CHOPPED FIBER and Technical Data Sheet 872A, 2 pages
21. FORTAFIL ® 3(C) PREPREGS and Technical Data Sheet 872D, 1 page The following materials are nonlimiting examples of resins useful for impregnating dry fibers and the following supplier specification and technical data for such resins are hereby incorporated herein by reference:

22. ARALDITE ® MY 720 epoxy resin, 6 pages
23. ARALDITE ® 508 flexible liquid epoxy resin, 3 pages
24. EPON ® Resin 828 epoxy resin, 3 pages
25. TACTIX TM Performance Polymers For Filament Winding, Braiding and Transfer Molding, 7 pages A useful description of various preimpregnated unidirectional tapes and fabrics for a variety of fibers is described in the following reference which is hereby incorporated herein by reference:

26. FIBERITE ® Composite Material Selection Handbook, 18 pages

Nonlimiting examples of bonding agents useful for fastening composite structure to composite structure, alloy or aluminum outer rims, and bearing block are described in the following industrial literature, and the following supplier specifications and technical data for such agents are hereby incorporated herein by reference:

27. CYANAMID TM BR 92 adhesive paste, 3 pages
28. CYANAMID TM BR 90 liquid adhesive, 6 pages
29. CYANAMID TM BR 89 structural adhesive, 4 pages
30. CYANAMID TM FXM 250 adhesive film, 2 pages
31. 3M Company Scotch-Weld brand adhesive, 2 pages
32. Rigid EPON ® Resin Systems, 4 pages
33. Ten Standard Hysol Epoxi-Patch ® Kit Formulations, 1 page
34. Dexter HYSOL Aerospace Products, pastes & liquids, syntactic foams & core splices, film adhesives and primers, 6 pages
35. ARALDITE ®, ARATHANE TM, ARAVITE TM structural adhesives, 4 pages In one embodiment of this invention the composite structure comprises a syntactic foam between plies for increasing the stiffness of the structure. Nonlimiting examples of syntactic foams useful for stiffening the structure are described in the following industrial literature, and the following supplier specifications and technical data therefor are hereby incorporated herein by reference:

36. SYNCORE ® HG 9822-1 composite, 2 pages
34. Dexter HYSOL Aerospace Product mentioned earlier with regard to bonding agents.

In one embodiment the composite structure of this invention is produced by injection molding of a thermoplastic material. Nonlimiting examples of thermoplastic materials useful for such injection molding production of the wheel of this invention are described in the following industrial literature, and the following supplier specification and technical data therefor are hereby incorporated herein by reference:

37. DUPONT undirectional KEVLAR ® with J-2 thermoplastic polyamide resin, 1 page
38. DUPONT J-2 Polymer Thermoplastic Resin Impregnated Tapes and Fabrics, 2 pages
39. SPECTRA ® High Performance Hybrid Reinforced Fiber Composites, Optimizing Properties with Polyethylene Fibers, 12 pages
40. XYDAR ® FC-110 High Performance Engineering Resins, and VECTRA ™ resins, 3 pages In yet another embodiment of this invention the composite structure is produced by compression molding of thermosetting plastic materials. Nonlimiting examples of thermosetting plastic materials useful for such injection molding of the wheel of this invention are described in the following industrial literature, and the following supplier specification and technical data therefor are hereby incorporated herein by reference:

41. FIBERITE ® MOLDING COMPOUNDS comprising phenolic, epoxy, silicone, polyamide and melamine molding compounds, 12 pages Flexible materials able to withstand elevated temperatures and useful for producing mandrel 70 comprise silicone elastomers, rubbers, especially silicone rubbers, and the like. Nonlimiting examples of flexible materials useful for producing mandrel 70 are described in the following industrial literature, and the following supplier specification and technical data therefor are hereby incorporated herein by reference:

42. SILASTIC ® X3-9595 Liquid Silicone Rubber, 3 pages
43. SILASTIC ® Q3-9590 A/B and Q3-9591 A/B liquid Silicone Rubber, 4 pages
44. RHODORSIL ® RTV 581 vulcanizing silicone elastomer, 3 pages
45. DAPCOCAST #51 (™) High Temp Casting Compound pourable tooling rubber, 1 page
46. RHODORSIL ® RTV 589b Silicone Elastomer for Mold Making, 4 pages Construction of woven organic cloth and cloth style are described in publication AMS 3902 which is hereby incorporated herein by reference.

In other embodiments of this invention the wheel has five spokes as shown in FIG. 16 or fifteen spokes as shown in FIG. 17. In one embodiment the spokes sections 100 and 102 are made separately and bonded to inner rim sections 104 and 106 and to adjacent spokes sections as shown by bonded joints 108 and 110 in FIG. 16 and bonded joints 112 and 114 in FIG. 17. The dotted lines in FIGS. 16 and 17 represent the inner surface of the hollow construction. Alternatively the parts of the wheel can be solid rather than hollow if weight is not an important factor. Spoke sections 100 and 102, and inner rim sections 104 and 106 can be produced using an inflatable mandrel designed for such sections in a manner similar to that described for the three wheel spoke. Alternately, the spoke sections and/or the inner rim sections can be made by injection or compression molding. In yet another alternative embodiment of this invention, the composite structure comprising inner rim, spokes and hub can be produced in a single unitary piece without bonded joints by injection or compression molding or the like. Although only a side elevational view is shown for the five and fifteen spoke wheels of FIGS. 16 and 17, it is to be understood that the spokes have an aerodynamic shape including the aerodynamic shapes similar to that shown in FIGS. 6 and 7.

The bicycle wheels constructed by the principals of this invention have improved strength and aerodynamic properties and are light weight. Table 2 shows the lateral and radial stiffness and weight of a wheel produced by the principals of this invention compared to 15 other wheel types. Tests were conducted as described in an article entitled Stiffness Characteristics of Bicycle Wheels, BIKE TECH, Volume 4, No. 3, June 1985, pages 1 to 7, which is hereby incorporated herein by reference. Care was taken to duplicate the testing procedures described in the article. The measurements for stiffness and weight reported in Table 2 were made by this inventor except for Test Nos. 12 to 16 which were taken from pages 4 and 5 of the article in BIKE TECH. The drag measurements were also made by another for the patentee.

It should be noted that data for two wheel sizes, namely 27-inch (68.6-cm) and 24-inch (61-cm) nominal diameter wheels, (hereinafter referred to as "24-inch" and "27-inch" wheels) are presented in Table 2. Since the wheel produced by this invention and tested was a 27-inch wheel, see Test No. 1, the results are directly comparable to similar data for other 27-inch wheels listed in Table 1. Of course, it will be appreciated that 24-inch wheels, because their smaller diameter, will always have superior strength, and weight less, than a similarly constructed 27-inch wheel. Nonetheless the stiffness data in Table 2 shows that the larger 27-inch wheel of this invention to be better than some of the smaller 24-inch wheels made by others. It is to be understood, however, that the wheel of this invention can be made as a 24-inch wheel or any other size.

The weight and testing of the wheels were all determined and made on the same basis, i.e. the wheel weight included rim, spokes, hub, spoke nipples where required, and bearing block, but did not include a tire or bearing subassembly with axle. Referring to Table 2, the wheels size used in the test were either 24-inch or 27-inch. Test Nos. 2 and 3 were with a KEVLAR ® disk wheel while Test No. 4 used a graphite disk wheel. The round spokes used in the wheels in Test Nos. 5 and 12 to 16 were 15 gauge or 0.072-inch (0.183-cm) diameter. The round spokes used in the wheels of Test No. 11 were 15 gauge on the ends, i.e. at the rim and hub, and 16 gauge 0.065-inch (0.165-cm) diameter in the middle of the spokes. With regard to the spoke shape, the term "Aero" means that the spokes had an elongated cross section, i.e. they were not round. With regard to the rim type, the term "Aero" means that the rim was not the conventional flat rim but had a cross section that allegedly improved the aerodynamics of the wheel, i.e. lowered the head-on drag. The abbreviations "Spoke Conf." means spoke configuration which has to do with spoke pattern and refers to the number of spokes crossed by a single spoke as explained in the referred article in BIKE TECH, and the term "N/A" stands for not applicable. The following abbreviations were used for the units: "lbs" for pounds, "in" for inches, "N" for newtons, "mm" for millimeters and "kg" for kilograms.

The wheels tested in Test Nos. 2, 3 and 4 were solid disk wheels. While it is known that disk wheels have improved aerodynamics going into the wind, it is also known that they have severe cross wind disadvantages because of the large sail area they present to cross winds. Strong cross winds are known to make the controllability of bicycles with disk wheels very poor and in some cases dangerous to the rider. While the head-on aerodynamics of the wheels of this invention are similar to the disk wheels as shown in Table 2, the wheels of this invention do not present a cross wind problem to their users because of the large open area between the rim and hub. Another demonstrated advantage of the wheel tested for this invention over disk wheels of the same size and weight is that wheel made by the principals of this invention have substantial better lateral stiffness than two of the three the disk wheels tested and perhaps even slightly better lateral stiffness than the third one tested; see Test Nos. 1 to 4. To achieve approximately the same lateral stiffness in a disk wheel as in the wheel of this invention required a disk wheel of twice the weight of the wheel of this invention; see Test Nos. 1 and 4.

It is also known that disk wheels have better head-on aerodynamics, i.e. lower drag, than metal spoke wheels even if the spokes are aerodynamically designed. For example it is known that the head-on aerodynamics or drag of the 27-inch diameter graphite disk wheel of Test No. 4 and the 27-inch diameter Kevlar disk wheel of Test No. 3 have better head-on aerodynamics or drag than all of the other 27-inch diameter spoke wheels mentioned in Table 2 except for the wheel of this invention. The head-on drag tests referred to in Table 2 were performed in a wind tunnel at 30 mph (48.3 km/hr) with the wheel mounted on a particular bicycle. As can be seen from the data presented in Table 2 the head-on drag with a bicycle having the wheel of this invention was just as low, and perhaps even slightly lower, than the graphite disk wheel of Test No. 4.

Torsional stiffness for the wheel of this invention was not measured because the relatively massive spokes of this invention impart such high torsional stiffness to the wheel that essentially no torsional deflection under ordinary loads can occur. Disk wheels also have more than enough torsional stiffness that torsional failure will not occur in disk wheels either. However, torsional stiffness is a problem in some conventional steel spoke wheels as explained in the article from BIKE TECH magazine. Thus the wheels of this invention have improved torsional stiffness over many conventional steel spoke wheels.

It is not necessary in all embodiments of this invention that the composite structure be hollow. In one embodiment the hollowed portion of the structure shown in FIGS. 4 to 8 is filled with a core material such as a plastic substance, for example an expandable plastic foam such as polystyrene or the like. The use of an expandable plastic core or the like improves the buckling strength of wheels having a relatively thin composite structure. Such relatively thin composite structures are useful for producing ultralight weight wheels. In yet another embodiment of this invention the core material is produced first for example by casting in a special mold and after curing the core material is used as a mandrel for forming the composite structure. In these alternative embodiments the core material remains as part of the wheel.

While the wheel of this invention is particularly useful with a bicycle it will be appreciated that the wheel of this invention can be used on a variety of vehicles including motorized vehicles and in particular motorcycles and the like.

While the preferred embodiments of the present invention have been described, it should be understood that various changes, adaptations and modifications may be made thereto without departing from the spirit of the invention and the scope of the appended claims. It should be understood, therefore, that the invention is not to be limited to minor details of the illustrated invention shown in the figures and that variations in such minor details will be apparent to one skilled in the art.

Therefore it is to be understood that the present disclosure and embodiment of this invention described herein are for purposes of illustration and example and that modifications and improvements may be made thereto without departing from the spirit of the invention or from the scope of the claims. The claims, therefore, are to be accorded a range of equivalents commensurate in scope with the advances made over the art.

TABLE 1

| | Layer (1) | Material | Ply Orientation (2) (degrees) |
|---|---|---|---|
| Region A | 1 | 120 Kevlar | 45 |
| | 2 | Uni Graphite | 0 |
| | 3 | Uni Graphite | 0 |
| | 4A | 120 Kevlar | 45 |
| | 5 | 181 Kevlar | 45 |
| | 6 | 120 E-Glass | 45 |
| Region B | 1 | 120 Kevlar | 45 |
| | 2 | Uni Graphite | 0 |
| | 3 | Uni Graphite | 0 |
| | 4A | 120 Kevlar | 45 |
| | 4B | Uni Graphite | 30 |
| | 4C | Uni Graphite | −30 |
| | 4D | Uni Graphite | −30 |
| | 4E | Uni Graphite | 30 |
| | 5 | 181 Kevlar | 45 |
| | 6 | 120 E-Glaas | 45 |
| Region C | 1 | 120 Kevlar | 45 |
| | 2 | Uni Graphite | 0 |
| | 3 | Uni Graphite | 0 |
| | 4A | 120 Kevlar | 45 |
| | 4B | Uni Graphite | 0 |
| | 4C | Uni Graphite | 0 |
| | 4D | Uni Graphite | 0 |
| | 4E | Uni Graphite | 0 |
| | 5 | 181 Kevlar | 45 |
| | 6 | 120 E-Glass | 45 |
| Region R | 1 | 181 S2-Glass | 0 |
| | 2 | Uni Graphite | 0 |
| | 3 | Uni Graphite | 0 |
| | 4 | Uni Graphite | 0 |
| | 5 | 181 S2-Glass | 0 |

(1) In order of application to mandrel
(2) See FIGS. 13 to 15 for orientation

TABLE 2

| | | | | | Lateral Stiffness | | Radial Stiffness | | | | | |
|---|---|---|---|---|---|---|---|---|---|---|---|---|
| Test No. | Wheel Size | No. Of Spokes | Spoke Type | Spoke Config. | Rim Type | $\left(\frac{lbs}{in}\right)$ | $\left(\frac{N}{mm}\right)$ | $\left(\frac{lbs}{in}\right)$ | $\left(\frac{N}{mm}\right)$ | Weight (lbs) (kg) | | Head-On Drag (lbs) (kg) | |
| WHEELS BUILT SPECIFICALLY FOR AERODYNAMIC IMPROVEMENT |||||||||||||
| Wheel Produced By Principles of This Invention |||||||||||||
| 1 | 27 | 3 | Aero | N/A | Aero | 400 | 70.1 | 10,150 | 1778 | 2.0 | 0.907 | 2.01 | 0.912 |

TABLE 2-continued

| Test No. | Wheel Size | No. Of Spokes | Spoke Type | Spoke Config. | Rim Type | Lateral Stiffness ($\frac{lbs}{in}$) | Lateral Stiffness ($\frac{N}{mm}$) | Radial Stiffness ($\frac{lbs}{in}$) | Radial Stiffness ($\frac{N}{mm}$) | Weight (lbs) | Weight (kg) | Head-On Drag (lbs) | Head-On Drag (kg) |
|---|---|---|---|---|---|---|---|---|---|---|---|---|---|
| \multicolumn{14}{c}{Wheels Produced by Others} |
| 2 | 24 | disk | N/A | N/A | N/A | 342 | 59.9 | 13,050 | 2285 | 1.9 | 0.862 | — | — |
| 3 | 27 | disk | N/A | N/A | N/A | 237 | 41.5 | 14,680 | 2571 | 1.7 | 0.771 | — | — |
| 4 | 27 | disk | N/A | N/A | N/A | 396 | 69.4 | 15,250 | 2671 | 4.1 | 1.86 | 2.04 | 0.925 |
| 5 | 24 | 16 | Round | Radial | Normal | 185 | 32.4 | 7,900 | 1384 | 1.5 | 0.680 | — | — |
| 6 | 24 | 18 | Aero | Radial | Aero | 410 | 71.8 | 9,950 | 1743 | 2.0 | 0.907 | — | — |
| 7 | 24 | 18 | Aero | Radial | Aero | 407 | 71.3 | 10,100 | 1769 | 2.0 | 0.907 | — | — |
| 8 | 27 | 28 | Aero | Radial | Aero | 380 | 66.5 | 9,120 | 1597 | 2.2 | 0.998 | — | — |
| 9 | 27 | 32 | Aero | 3 Cross | Normal | 365 | 63.9 | 9,650 | 1690 | 2.3 | 1.043 | — | — |
| 10 | 27 | 36 | Aero | Radial | Normal | 500 | 87.6 | 11,200 | 1961 | 2.4 | 1.089 | — | — |
| \multicolumn{14}{c}{CONVENTIONAL WHEELS} |
| 11 | 27 | 36 | Round | 3 Cross | Normal | 475 | 83.2 | 10,975 | 1922 | 2.3 | 1.043 | — | — |
| \multicolumn{14}{c}{Data Reported in Literature for Conventional Wheels} |
| 12 | 27 | 36 | Round | Radial | Normal | 616 | 107.8 | 13,960 | 2444 | 2.3 | 1.043 | — | — |
| 13 | 27 | 36 | Round | 1 Cross | Normal | 656 | 114.8 | 11,850 | 2075 | 2.3 | 1.043 | — | — |
| 14 | 27 | 36 | Round | 2 Cross | Normal | 634 | 111.0 | 14,130 | 2475 | 2.3 | 1.043 | — | — |
| 15 | 27 | 36 | Round | 3 Cross | Normal | 606 | 106.2 | 13,050 | 2286 | 2.3 | 1.043 | — | — |
| 16 | 27 | 36 | Round | 4 Cross | Normal | 576 | 100.9 | 11,970 | 2096 | 2.3 | 1.043 | — | — |

What is claimed is:

1. A wheel comprising:
   a hub having an axial bore;
   an inner rim connected to said hub by spokes;
   an outer rim connected to said inner rim, said outer rim for receiving a tire; and,
   a bearing block fastened to said axial bore of said hub and adaptable for receiving a bearing subassembly with an axle,
   the number of said spokes being at least three, said spokes having a leading edge, a trailing edge and an aerodynamic shape, said leading edge having a radius of curvature which is at least as large as the radius of curvature of said trailing edge, the spokes having a major dimension in a direction parallel to the tangent of said inner rim at a point radially through said spoke, said spokes having a minor dimension in a direction parallel to the axis of said wheel, the ratio of said major dimension of said spoke to the minor dimension of said spoke being at least about two, and, said spokes being symmetrical about a plane perpendicular to the axis of said wheel and through said leading and trailing edges of said spoke,
   said hub, said spokes and said inner rim being made of a plurality of laminated lightweight, high strength materials selected from the group consisting of plastic-containing substances which contains fibers and mixtures thereof, wherein said plurality of laminated lightweight, high strength materials and said fibers in said wheel are effective for causing said wheel to have a lateral stiffness of at least about 200 lbs per inch, and a radial stiffness midway between said spokes of at least about 8000 lbs per inch, wherein said stiffness is determined without a tire and without a bearing subassembly and axle.

2. The wheel of claim 1, wherein said material is a temperature curable plastic-containing substance.

3. The wheel of claim 1, wherein said radius of curvature of said leading edge is at least about three times larger than said radius of curvature of said trailing edge.

4. The wheel of claim 1, wherein said spokes are elliptical shaped in cross section.

5. The wheel of claim 1, wherein said inner rim has a maximum axial thickness and wherein said spokes have a maximum axial thickness which is no greater than said maximum axial thickness of said inner rim.

6. The wheel of claim 1, wherein the number of said spokes is from 3 to 15.

7. The wheel of claim 1, wherein the number of said spokes is 3.

8. The wheel of claim 1, wherein said inner rim comprises a U-shaped member and a composite closeout member,
   wherein said composite closeout member is annular and forms a first unitary composite structure having no bonded joints internally within said first composite member,
   wherein said U-shaped member, said spokes and said hub form a second unitary composite structure having no bonded joints internally within said second unitary composite structure, and
   wherein said composite closeout member is bonded to said U-shaped member thereby forming a bonded composite structure comprising said first unitary composite structure and said second unitary composite structure.

9. The wheel of claim 8, wherein said bonded composite structure is hollow.

10. The wheel of claim 8, wherein said inner rim is hollow, said spokes are hollow and said hub is hollow.

11. The wheel of claim 1, wherein said inner rim has a trailing edge facing said hub.

12. The wheel of claim 1, wherein said radius of curvature of said leading edge is at least about two times larger than said radius of curvature of said trailing edge, wherein said spoke has a maximum axial thickness and a chord length "D", and wherein said maximum axial thickness occurs at a distance about 0.30·D from said leading edge.

13. The wheel of claim 1, wherein said spokes are a solid construction.

14. The wheel of claim 1, wherein said inner rim is a solid construction.

15. The wheel of claim 1, wherein said fibers selected from the group consisting of aromatic polyamide fibers, carbon fibers, alumina fibers, silicone carbide fibers, boron fibers, glass fibers and mixtures thereof.

16. The wheel of claim 1, wherein said wheel has an axis, wherein said spokes, said inner rim and said hub define an open area, and wherein said open area when projected on to a plane perpendicular to said axis is at least about 40% of the area of a circle of a diameter equal to said diameter of said outer rim.

17. The wheel of claim 1, wherein said wheel has an axis, wherein said spokes, said inner rim and said hub define an open area, and wherein said open area when projected on to a plane perpendicular to said axis is at least about 50% of the area of a circle of a diameter equal to said diameter of said outer rim.

18. The wheel of claim 1, wherein said outer rim is a lightweight, high strength material selected from the group consisting of plastic-containing substances and mixtures thereof.

19. The wheel of claim 18, further comprising a metal surface fastened to said outer rim for providing a metal surface for opposing friction surfaces of a brake.

20. The wheel of claim 1, wherein said outer rim is from metal.

21. The wheel of claim 1, wherein said outer rim is from an aluminum-containing metal.

22. The wheel of claim 1, wherein said outer rim is connected to said inner rim by an adhesive bond.

23. The wheel of claim 22, wherein said adhesive bond can be broken without damaging said inner rim thereby allowing a replacement outer rim to be connected to said inner rim.

24. The wheel of claim 1, wherein said outer rim and said inner rim are an unitary structure.

25. The wheel of claim 1, wherein said lateral stiffness is at least about 300 lbs per inch.

26. A wheel comprising:
a hub having an axial bore:
an inner rim connected to said hub by spokes;
an outer rim connected to said inner rim, said outer rim for receiving a tire, said outer rim having an outside diameter; and,
a bearing block fastened to said axial bore of said hub and adaptable for receiving a bearing subassembly with an axle,
the number of said spokes being at least three, said spokes having a leading edge, a trailing edge and an aerodynamic shape, said leading edge having a radius of curvature which is at least as large as the radius of curvature of said trailing edge, the spokes having a major dimension in a direction parallel to the tangent of said inner rim at a point radially through said spoke, said spokes having a minor dimension in a direction parallel to the axis of said wheel, the ratio of said major dimension of said spoke to the minor dimension of said spoke being at least about two, and, said spokes being symmetrical about a plane perpendicular to the axis of said wheel and through said leading and trailing edges of said spoke,
said hub, said spokes and said inner rim being made of a plurality of laminated lightweight, high strength materials selected from the group consisting of plastic-containing substances which contains fibers and mixtures thereof, such that said wheel has a weight no greater than about 0.12 lbs per inch of said outside diameter of said outer rim, wherein said weight is determined without a tire and without a bearing subassembly and axle, wherein said plurality of laminated lightweight, high strength materials and the orientation of said fibers in said wheel are effective for causing said wheel to have a lateral stiffness of at least about 200 lbs per inch, and a radical stiffness midway between said spokes of at least about 8000 lbs per inch, wherein said stiffness is determined without a tire and without a bearing subassembly and axle.

27. The wheel of claim 26, wherein said lateral stiffness is at least about 300 lbs per inch.

28. The wheel of claim 26, wherein said lateral stiffness is at least about 400 lbs per inch.

29. The wheel of claim 26, wherein said radial stiffness is at least about 9,000 lbs per inch.

30. The wheel of claim 26, wherein said radial stiffness is at least about 10,000 lbs per inch.

31. The wheel of claim 26, wherein said weight of said wheel is no greater than about 0.10 lbs per inch of said diameter of said outer rim.

32. The wheel of claim 26, wherein said weight of said wheel is no greater than about 0.08 lbs per inch of said diameter of said outer rim.

33. A wheel comprising a hub having an axial bore;
an inner rim connected to said hub by spokes; and,
a bearing block fastened to said axial bore of said hub and adaptable for receiving a bearing subassembly with an axle,
the number of said spokes being at least three and said spokes having an aerodynamic shape,
said hub, said spokes and said inner rim being a lightweight, high strength material selected from the group consisting of plastic-containing substances and mixtures thereof,
wherein said inner rim, said spokes and said hub are hollow,
wherein said spokes have a leading edge and a trailing edge,
wherein said inner rim has a trailing edge facing said hub,
wherein said lightweight, high strength material of said inner rim, said spokes and said hub comprise one or more layers of plastic fibers, one or more layers of carbon fibers, and one or more layers of glass fibers,
wherein said plastic fibers and said glass fibers in said leading edge and trailing edge of said spoke and in said trailing edge of said inner rim lay at an oblique angle to said edges, and
wherein said carbon fibers lay in about a radial direction in said spokes and in about a parallel direction to said trailing edge in said inner rim.

34. A wheel comprising a hub having an axial bore;
an inner rim connected to said hub by spokes; and,
a bearing block fastened to said axial bore of said hub and adaptable for receiving a bearing subassembly with an axle,
the number of said spokes being at least three and said spokes having an aerodynamic shape,
said hub, said spokes and said inner rim being a lightweight, high strength material selected from the group consisting of plastic-containing substances and mixtures thereof,
wherein said inner rim comprises a U-shaped member and a composite closeout member, wherein said composite closeout member is an annular unitary composite structure having no bonded joints internally within said composite closeout member, and wherein said composite closeout member is bonded to said U-shaped member, wherein said lightweight, high strength material of said composite closeout member comprises one or more layers of glass fibers and one or more layers of carbon fibers, and wherein some of the fibers of said layers of glass fibers and some of the fibers of said layers of carbon fibers lay in a circumferential direction in and around said composite closeout member.

35. The wheel of claim 34, wherein said wheel has an axis, wherein said spokes have a leading edge and a trailing edge and are symmetrical about a plane perpendicular to said axis of said wheel and through said leading and trailing edges of said spokes.

36. The wheel of claim 35 wherein said leading edge has a radius of curvature and said trailing edge has a radius of curvature and wherein said radius of curvature of said leading edge is at least as large as said radius of curvature of said trailing edge.

37. A wheel comprising a hub having an axial bore; an inner rim connected to said hub by spokes; and, a bearing block fastened to said axial bore of said hub and adaptable for receiving a bearing subassembly with an axle, the number of said spokes being at least three and said spokes having an aerodynamic shape, said hub, said spokes and said inner rim being a lightweight, high strength material selected from the group consisting of plastic-containing substances and mixtures thereof, wherein said inner rim, said spokes and said hub are hollow, wherein said spokes have a leading edge and a trailing edge, wherein said inner rim has a trailing edge facing said hub, wherein said lightweight, high strength material of said inner rim, said spokes and said hub comprise one or more layers of plastic fibers, one or more layers of carbon fibers, and one or more layers of glass fibers, wherein said lightweight, high strength material of said inner rim, said spokes and said hub comprise a first layer of woven aromatic polyamide fibers, followed by a first layer of unidirectional carbon fibers, followed by a second layer of unidirectional carbon fibers, followed by a second layer of woven aromatic polyamide fibers, followed by a third layer of woven aromatic fibers, followed by a layer of glass fibers, wherein said fibers of said layers of woven aromatic polyamide fibers and said layer of glass fibers in said leading edge and trailing edge of said spoke and in said trailing edge of said inner rim lay at an oblique angle to said edges, and wherein said unidirectional carbon fibers lay in about a radial direction in said spokes and in about a parallel direction to said trailing edge in said inner rim.

38. The wheel of claim 37 wherein said lightweight, high strength material of said inner rim, said spokes and said hub further comprise several additional layers of unidirectional carbon fibers spaced between said second and third layer of woven aromatic polyamide fibers, wherein said fibers of said several additional layers of unidirectional carbon fibers in said spokes are oblique to the radius of said wheel, and wherein said fibers of said several additional layers of unidirectional carbon fibers in said inner rim are parallel to said trailing edge of said inner rim.

* * * * *